(12) United States Patent
Kobayashi et al.

(10) Patent No.: US 7,861,142 B2
(45) Date of Patent: Dec. 28, 2010

(54) INFORMATION RECORDING DISC, RECORDING AND/OR REPRODUCING DEVICE AND METHOD

(75) Inventors: Shoei Kobayashi, Tokyo (JP); Susumu Senshu, Tokyo (JP); Tamotsu Yamagami, Tokyo (JP); Makoto Usui, Osaka (JP); Hideshi Ishihara, Katano (JP); Mitsurou Moriya, Ikoma (JP); Cornelis Marinus Schep, Eindhoven (NL); Jakob Gerrit Nijboer, Geldrop (NL); Aalbert Stek, Eindhoven (NL)

(73) Assignees: Sony Corporation, Tokyo (JP); Panasonic Corporation, Kadoma-shi (JP); Koninklijke Philips Electronics N.V., Eindhoven (NL)

( * ) Notice: Subject to any disclaimer, the term of this patent is extended or adjusted under 35 U.S.C. 154(b) by 475 days.

(21) Appl. No.: 11/739,329

(22) Filed: Apr. 24, 2007

(65) Prior Publication Data

US 2007/0198894 A1 Aug. 23, 2007

Related U.S. Application Data

(62) Division of application No. 10/472,700, filed as application No. PCT/JP03/00681 on Jan. 24, 2003, now Pat. No. 7,454,688.

(30) Foreign Application Priority Data

Jan. 25, 2002 (JP) .............................. 2002-017246

(51) Int. Cl.
G11C 29/00 (2006.01)
G11B 20/00 (2006.01)

(52) U.S. Cl. ..................................... 714/769; 369/47.19
(58) Field of Classification Search .................. 714/769
See application file for complete search history.

(56) References Cited

U.S. PATENT DOCUMENTS 5,379,305 A * 1/1995 Weng .......................... 714/774
6,414,920 B1 7/2002 Lee (Continued)

FOREIGN PATENT DOCUMENTS

EP 1 102 263 5/2001

(Continued)

OTHER PUBLICATIONS

U.S. Appl. No. 11/736,758, filed Apr. 18, 2007, Kobayashi, et al.

(Continued)

*Primary Examiner*—Daniell L Negrón
*Assistant Examiner*—Nicholas Lee
(74) *Attorney, Agent, or Firm*—Oblon, Spivak, McClelland, Maier & Neustadt, L.L.P.

(57) ABSTRACT

Four ECC blocks are recorded in a burst cutting area of an optical disc. Each ECC block is constituted by a BCA content code of 1 byte, content data length of 1 byte, and content data of 14 bytes. Of the BCA content data, the leading 6 bits are used for application ID and the remaining 2 bits are used for block number. Disc ID is stored in the content data. Since the four ECC blocks exist, the optical disc can be managed individually by four applications at the maximum. Thus it becomes possible to manage the same optical disc by a plurality of applications.

10 Claims, 16 Drawing Sheets

U.S. PATENT DOCUMENTS

| | | |
|---|---|---|
| 6,594,794 B1 * | 7/2003 | De Marzi et al. ............ 714/784 |
| 6,608,804 B2 | 8/2003 | Shim |
| 6,694,023 B1 | 2/2004 | Kim |
| 6,938,162 B1 * | 8/2005 | Nagai et al. ................ 713/189 |
| 6,961,511 B2 | 11/2005 | Ohno et al. |
| 2001/0021144 A1 * | 9/2001 | Oshima et al. ................ 369/13 |
| 2001/0055132 A1 | 12/2001 | Oshima et al. |
| 2002/0025039 A1 * | 2/2002 | Kato et al. .................... 380/44 |
| 2004/0158796 A1 | 8/2004 | Kobayashi et al. |
| 2004/0246865 A1 | 12/2004 | Kobayashi et al. |

FOREIGN PATENT DOCUMENTS

| | | |
|---|---|---|
| EP | 1 115 117 | 7/2001 |
| GB | 2 332 977 | 7/1999 |
| JP | 5-62363 | 3/1993 |
| JP | 10-144006 | 5/1998 |
| JP | 11-102576 | 4/1999 |
| JP | 2000-323995 | 11/2000 |
| JP | 2001-256655 | 9/2001 |
| JP | 2001-351243 | 12/2001 |
| WO | WO 97/14146 | 4/1997 |
| WO | WO 01/06502 A1 | 1/2001 |

OTHER PUBLICATIONS

U.S. Appl. No. 11/736,817, filed Apr. 18, 2007, Kobayashi, et al.
U.S. Appl. No. 11/739,298, filed Apr. 24, 2007, Kobayashi, et al.
U.S. Appl. No. 11/739,329, filed Apr. 24, 2007, Kobayashi, et al.

* cited by examiner

| SOURCE DATA | MODULATION PATTERN ||
| --- | --- | --- |
| | SYNCHRONIZING PART | DATA PART |
| 00 | 010 | 1000 |
| 01 | 010 | 0100 |
| 10 | 010 | 0010 |
| 11 | 010 | 0001 |

| 1 BYTE | 4 BYTES | |
|---|---|---|
| | 5 BYTES | |
| $SB_{BCA},-1$ | BCA-Preamble (AIL00h) | 1 LINE |
| $SB_{BCA},0$<br>$SB_{BCA},0$<br>$SB_{BCA},0$<br>$SB_{BCA},0$ | $I_{0,0}$   $I_{0,1}$   $I_{0,2}$   $I_{0,3}$<br>$I_{0,4}$   $I_{0,5}$   $I_{0,6}$   $I_{0,7}$<br>$I_{0,8}$   $I_{0,9}$   $I_{0,10}$   $I_{0,11}$<br>$I_{0,12}$   $I_{0,13}$   $I_{0,14}$   $I_{0,15}$ | 4 LINES |
| $SB_{BCA},1$<br>$SB_{BCA},1$<br>$SB_{BCA},1$<br>$SB_{BCA},1$ | $C_{0,0}$   $C_{0,1}$   $C_{0,2}$   $C_{0,3}$<br>$C_{0,4}$   $C_{0,5}$   $C_{0,6}$   $C_{0,7}$<br>$C_{0,8}$   $C_{0,9}$   $C_{0,10}$   $C_{0,11}$<br>$C_{0,12}$   $C_{0,13}$   $C_{0,14}$   $C_{0,15}$ | 4 LINES |
| $SB_{BCA},2$<br>$SB_{BCA},2$<br>$SB_{BCA},2$<br>$SB_{BCA},2$ | $I_{1,0}$   $I_{1,1}$   $I_{1,2}$   $I_{1,3}$<br>$I_{1,4}$   $I_{1,5}$   $I_{1,6}$   $I_{1,7}$<br>$I_{1,8}$   $I_{1,9}$   $I_{1,10}$   $I_{1,11}$<br>$I_{1,12}$   $I_{1,13}$   $I_{1,14}$   $I_{1,15}$ | 4 LINES |
| $SB_{BCA},3$<br>$SB_{BCA},3$<br>$SB_{BCA},3$<br>$SB_{BCA},3$ | $C_{1,0}$   $C_{1,1}$   $C_{1,2}$   $C_{1,3}$<br>$C_{1,4}$   $C_{1,5}$   $C_{1,6}$   $C_{1,7}$<br>$C_{1,8}$   $C_{1,9}$   $C_{1,10}$   $C_{1,11}$<br>$C_{1,12}$   $C_{1,13}$   $C_{1,14}$   $C_{1,15}$ | 4 LINES |
| $SB_{BCA},4$<br>$SB_{BCA},4$<br>$SB_{BCA},4$<br>$SB_{BCA},4$ | $I_{2,0}$   $I_{2,1}$   $I_{2,2}$   $I_{2,3}$<br>$I_{2,4}$   $I_{2,5}$   $I_{2,6}$   $I_{2,7}$<br>$I_{2,8}$   $I_{2,9}$   $I_{2,10}$   $I_{2,11}$<br>$I_{2,12}$   $I_{2,13}$   $I_{2,14}$   $I_{2,15}$ | 4 LINES |
| $SB_{BCA},5$<br>$SB_{BCA},5$<br>$SB_{BCA},5$<br>$SB_{BCA},5$ | $C_{2,0}$   $C_{2,1}$   $C_{2,2}$   $C_{2,3}$<br>$C_{2,4}$   $C_{2,5}$   $C_{2,6}$   $C_{2,7}$<br>$C_{2,8}$   $C_{2,9}$   $C_{2,10}$   $C_{2,11}$<br>$C_{2,12}$   $C_{2,13}$   $C_{2,14}$   $C_{2,15}$ | 4 LINES |
| $SB_{BCA},6$<br>$SB_{BCA},6$<br>$SB_{BCA},6$<br>$SB_{BCA},6$ | $I_{3,0}$   $I_{3,1}$   $I_{3,2}$   $I_{3,3}$<br>$I_{3,4}$   $I_{3,5}$   $I_{3,6}$   $I_{3,7}$<br>$I_{3,8}$   $I_{3,9}$   $I_{3,10}$   $I_{3,11}$<br>$I_{3,12}$   $I_{3,13}$   $I_{3,14}$   $I_{3,15}$ | 4 LINES |
| $SB_{BCA},7$<br>$SB_{BCA},7$<br>$SB_{BCA},7$<br>$SB_{BCA},7$ | $C_{3,0}$   $C_{3,1}$   $C_{3,2}$   $C_{3,3}$<br>$C_{3,4}$   $C_{3,5}$   $C_{3,6}$   $C_{3,7}$<br>$C_{3,8}$   $C_{3,9}$   $C_{3,10}$   $C_{3,11}$<br>$C_{3,12}$   $C_{3,13}$   $C_{3,14}$   $C_{3,15}$ | 4 LINES |
| $SB_{BCA},-2$ | | |

FIG.4

| SYNC # | MODULATION PATTERN (28chbit) | | | |
|---|---|---|---|---|
| | SYNC BODY | | SYNC ID | |
| | SYNC BODY 1 | SYNC BODY 2 | SYNC ID 1 | SYNC ID 2 |
| SB$_{BCA,-1}$ | 010 0001 | 001 0100 | 010 0001 | 010 0001 |
| SB$_{BCA,0}$ | 010 0001 | 001 0100 | 010 1000 | 010 1000 |
| SB$_{BCA,1}$ | 010 0001 | 001 0100 | 010 1000 | 010 0100 |
| SB$_{BCA,2}$ | 010 0001 | 001 0100 | 010 1000 | 010 0010 |
| SB$_{BCA,3}$ | 010 0001 | 001 0100 | 010 1000 | 010 0001 |
| SB$_{BCA,4}$ | 010 0001 | 001 0100 | 010 0100 | 010 1000 |
| SB$_{BCA,5}$ | 010 0001 | 001 0100 | 010 0100 | 010 0100 |
| SB$_{BCA,6}$ | 010 0001 | 001 0100 | 010 0100 | 010 0010 |
| SB$_{BCA,7}$ | 010 0001 | 001 0100 | 010 0100 | 010 0001 |
| SB$_{BCA,-2}$ | 010 0001 | 001 0100 | 010 0001 | 010 0010 |

FIG.5

| BYTE \ BIT | 7 | 6 | 5 | 4 | 3 | 2 | 1 | 0 |
|---|---|---|---|---|---|---|---|---|
| 0 | \multicolumn{8}{c}{BCA Content Code} |
| 1 | \multicolumn{8}{c}{Content Data Length} |
| 2 : Length+1 | \multicolumn{8}{c}{Content Data} |
| 16 | \multicolumn{8}{c}{BCA Content Code} |
| 17 | \multicolumn{8}{c}{Content Data Length} |
| 18 : Length+17 | \multicolumn{8}{c}{Content Data} |
| 32 | \multicolumn{8}{c}{BCA Content Code} |
| 33 | \multicolumn{8}{c}{Content Data Length} |
| 34 : Length+33 | \multicolumn{8}{c}{Content Data} |
| 48 | \multicolumn{8}{c}{BCA Content Code} |
| 49 | \multicolumn{8}{c}{Content Data Length} |
| 50 : Length+49 | \multicolumn{8}{c}{Content Data} |

FIG.8

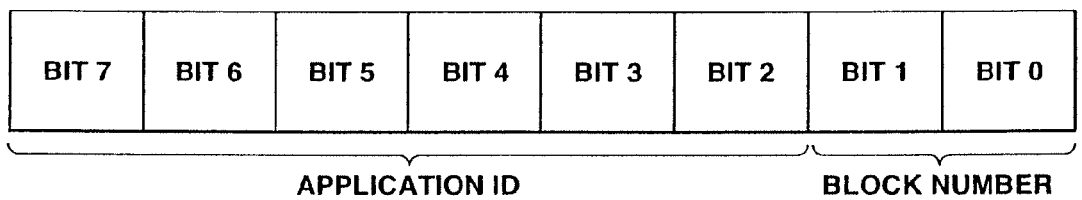

FIG.9

|  | 5 BYTES | | | | |
|---|---|---|---|---|---|
| 1 BYTE | 4 BYTES | | | | |
| $S_{BBCA,-1}$ | BCA-Preamble (A1L00h) | | | | 1 LINE |
| $S_{BBCA,0}$ | $I_{0,0}$ | $I_{0,1}$ | $I_{0,2}$ | $I_{0,3}$ | |
| $S_{BBCA,0}$ | $I_{0,4}$ | $I_{0,5}$ | $I_{0,6}$ | $I_{0,7}$ | |
| $S_{BBCA,0}$ | $I_{0,8}$ | $I_{0,9}$ | $I_{0,10}$ | $I_{0,11}$ | 4 LINES |
| $S_{BBCA,0}$ | $I_{0,12}$ | $I_{0,13}$ | $I_{0,14}$ | $I_{0,15}$ | |
| $S_{BBCA,1}$ | $C_{0,0}$ | $C_{0,1}$ | $C_{0,2}$ | $C_{0,3}$ | |
| $S_{BBCA,1}$ | $C_{0,4}$ | $C_{0,5}$ | $C_{0,6}$ | $C_{0,7}$ | |
| $S_{BBCA,1}$ | $C_{0,8}$ | $C_{0,9}$ | $C_{0,10}$ | $C_{0,11}$ | 4 LINES |
| $S_{BBCA,1}$ | $C_{0,12}$ | $C_{0,13}$ | $C_{0,14}$ | $C_{0,15}$ | |
| $S_{BBCA,-2}$ | | | | | |

FIG.13

INFORMATION RECORDING DISC, RECORDING AND/OR REPRODUCING DEVICE AND METHOD

CROSS-REFERENCE TO RELATED APPLICATIONS

This application is a divisional of and is based upon and claims the benefit of priority under 35 U.S.C. §120 from U.S. application Ser. No. 10/472,700, filed on Sep. 23, 2003, which is the U.S. National Stage of International Application No. PCT/JP03/00681, filed on Jan. 24, 2003, and claims the benefit of priority under 35 U.S.C. §119 from Japanese Patent Application 2002-017246, filed on Jan. 25, 2002, the entire contents of each of which are incorporated herein by reference in their entirety.

TECHNICAL FIELD

This invention relates to an information recording device and method, an information reproducing device and method, a recording medium, a program, and a disc recording medium, and particularly to an information recording device and method which enables recording of a plurality of disc IDs, an information reproducing device and method, a recording medium, a program, and a disc recording medium.

BACKGROUND ART

As a disc recording medium on which, for example, digital data such as a high-quality digital video signal is optically recorded, a playback-only DVD (digital versatile disc or digital video disc) has been broadly known. Moreover, as disc recording media which enable writing once or rewriting by using the DVD format, a DVD-R (DVD-recordable), a DVD-RW (DVD-rewritable) and a DVD-RAM (DVD-random access memory) are being popularized.

Furthermore, a next-generation optical disc is to be commercialized which can realize a large capacity of approximately more than 23 gigabytes with a track pitch of 0.32 μm, a scanning density of 0.12 μm/bit and a diameter of 120 mm, by using a combination of a blue laser beam with a wavelength of 405 nm and an objective lens with NA of 0.85. With respect to this next-generation optical disc, a recording layer is formed on a substrate, and a transparent cover layer with a thickness of approximately 0.1 mm is formed on the recording layer. The transparent cover layer has an excellent optical characteristic and it is hard-coated so as to be scratch-proof, for example. The laser beam is cast onto the recording layer via the transparent cover layer having the above-described thickness of 0.1 mm.

By reducing the thickness of the transparent cover layer, the spot diameter of the laser beam on the recording layer can be reduced. However, if the spot diameter is thus reduced, the optical disc becomes more susceptible to a dust particle of a size which would not cause any problem when the spot diameter is large.

Therefore, in the case of recording data onto the next-generation optical disc with a thin transparent cover layer, reinforcement of an error correcting code is necessary. This also applies to a BCA (burst cutting area) on an optical disc where the disc ID is recorded, as well as a data area where content data is recorded.

However, since only one disc ID can be recorded on the conventional optical disc, a single optical disc cannot be managed by a plurality of applications.

DISCLOSURE OF THE INVENTION

In view of the foregoing status of the art, it is an object of the present invention to enable management of a single disc recording medium by a plurality of applications.

A first information recording device according to the present invention comprises: acquisition means for acquiring auxiliary information; blocking means for blocking the auxiliary information acquired by the acquisition means to generate error correction blocks with a header added thereto, the header containing an identification number and a block number to which the auxiliary information corresponds; and recording means for recording the plurality of error correction blocks containing the auxiliary information having the header added thereto, which are generated by the blocking means, into a burst cutting area on a disc recording medium.

When arranging the same auxiliary information in each of the plurality of error correction blocks, the blocking means may give the same block number to the plurality of error correction blocks in which the same auxiliary information is arranged.

When arranging the auxiliary information over the plurality of error correction blocks, the blocking means may use serial numbers as the block numbers of the plurality of error correction block over which the auxiliary information is arranged.

The blocking means may cause the header to contain length information representing the length of the auxiliary information.

Moreover, the blocking means may cause the header to contain length information representing the length of the auxiliary information, and when arranging the auxiliary information over the plurality of error correction blocks, the blocking means may describe the actual length of the auxiliary information as the length information of each of the plurality of error correction blocks over which the auxiliary information is arranged.

Furthermore, the blocking means may cause the header to contain length information representing the length of the auxiliary information, and if the auxiliary information is shorter than a fixed-length data part of the error correction blocks, the blocking means may describe the length of the data part of the error correction blocks as the length information of the error correction blocks.

The information recording device may also comprise modulation means for modulating the error correction blocks generated by the blocking means, and the recording means may record the error correction blocks modulated by the modulation means into the burst cutting area on the disc recording medium.

The blocking means may use error correction blocks having an error correcting code RS(m,n,k) as the error correction blocks.

The modulation means may modulate only a part of parities having a length of k−1.

The modulation means may modulate only parities of (k−1)/2, which are a part of parities having a length of k−1.

The modulation means may 4/1-modulate the error correction blocks.

A first information recording method according to the present invention comprises: an acquisition step of acquiring auxiliary information; a blocking step of blocking the auxiliary information acquired by the processing of the acquisition step to generate error correction blocks with a header added thereto, the header containing an identification number and a block number to which the auxiliary information corresponds; and a recording step of recording the plurality of error correction blocks containing the auxiliary information having the header added thereto, which are generated by the processing of the blocking step, into a burst cutting area on a disc recording medium.

A program on a first recording medium according to the present invention is adapted for an information recording device for recording, onto a disc recording medium having a data area for recording main data and a burst cutting area for recording auxiliary information, the auxiliary information proper to the disc recording medium, the program comprising: an acquisition step of acquiring the auxiliary information; a blocking step of blocking the auxiliary information acquired by the processing of the acquisition step to generate error correction blocks with a header added thereto, the header containing an identification number and a block number to which the auxiliary information corresponds; and a recording step of recording the plurality of error correction blocks containing the auxiliary information having the header added thereto, which are generated by the processing of the blocking step, into the burst cutting area on the disc recording medium.

A first program according to the present invention is executable by a computer which controls an information recording device for recording, onto a disc recording medium having a data area for recording main data and a burst cutting area, auxiliary information proper to the disc recording medium, the program comprising: an acquisition step of acquiring the auxiliary information; a blocking step of blocking the auxiliary information acquired by the processing of the acquisition step to generate error correction blocks with a header added thereto, the header containing an identification number and a block number to which the auxiliary information corresponds; and a recording step of recording the plurality of error correction blocks containing the auxiliary information having the header added thereto, which are generated by the processing of the blocking step, into the burst cutting area on the disc recording medium.

A disc recording medium according to the present invention has auxiliary information proper to the disc recording medium recorded in a burst cutting area, the auxiliary information being blocked to generate error correction blocks with a header added thereto, the header containing an identification number and a block number to which the auxiliary information corresponds.

A second information recording device according to the present invention comprises: first acquisition means for acquiring auxiliary information proper to a disc recording medium recorded in a burst cutting area, the auxiliary information being blocked to generate error correction blocks with a header added thereto, the header containing an identification number and a block number; second acquisition means for acquiring main data; encryption means for encrypting the main data acquired by the second acquisition means on the basis of the auxiliary information acquired by the first acquisition means; modulation means for modulating the main data encrypted by the encryption means; and recording means for recording the main data modulated by the modulation means into a data area on the disc recording medium.

Only a part of parities having a length of k−1 of the auxiliary information may be encoded.

Only parities of (k−1)/2, which are a part of parities having a length of k−1, of the auxiliary information may be encoded.

The error correcting code RS(m,n,k) may be RS(248, 216, 33).

A second information recording method according to the present invention comprises: a first acquisition step of acquiring auxiliary information proper to a disc recording medium recorded in a burst cutting area, the auxiliary information being blocked to generate error correction blocks with a header added thereto, the header containing an identification number and a block number; a second acquisition step of acquiring main data; an encryption step of encrypting the main data acquired by the processing of the second acquisition step on the basis of the auxiliary information acquired by the processing of the first acquisition step; a modulation step of modulating the main data encrypted by the processing of the encryption step; and a recording step of recording the main data modulated by the processing of the modulation step into a data area on the disc recording medium.

A program on a second recording medium according to the present invention is adapted for an information recording device for recording main data onto a disc recording medium having a data area for recording the main data and a burst cutting area for recording auxiliary information, the program comprising: a first acquisition step of acquiring the auxiliary information proper to the disc recording medium recorded in the burst cutting area, the auxiliary information being blocked to generate error correction blocks with a header added thereto, the header containing an identification number and a block number; a second acquisition step of acquiring the main data; an encryption step of encrypting the main data acquired by the processing of the second acquisition step on the basis of the auxiliary information acquired by the processing of the first acquisition step; a modulation step of modulating the main data encrypted by the processing of the encryption step; and a recording step of recording the main data modulated by the processing of the modulation step into the data area on the disc recording medium.

A second program according to the present invention is executable by a computer which controls an information recording device for recording main data onto a disc recording medium having a data area for recording the main data and a burst cutting area for recording auxiliary information, the program comprising: a first acquisition step of acquiring the auxiliary information proper to the disc recording medium recorded in the burst cutting area, the auxiliary information being blocked to generate error correction blocks with a header added thereto, the header containing an identification number and a block number; a second acquisition step of acquiring the main data; an encryption step of encrypting the main data acquired by the processing of the second acquisition step on the basis of the auxiliary information acquired by the processing of the first acquisition step; a modulation step of modulating the main data encrypted by the processing of the encryption step; and a recording step of recording the main data modulated by the processing of the modulation step into the data area on the disc recording medium.

An information reproducing device according to the present invention comprises: acquisition means for acquiring auxiliary information proper to a disc recording medium recorded in a burst cutting area, the auxiliary information being blocked to generate error correction blocks with a header added thereto, the header containing an identification number and a block number; reproduction means for reproducing main data from a data area; demodulation means for demodulating the main data reproduced by the reproduction means; and decoding means for decoding the main data demodulated by the demodulation means on the basis of the auxiliary information acquired by the acquisition means.

Only a part of parities having a length of k−1 of the auxiliary information may be encoded.

Only parities of (k−1)/2, which are a part of parities having a length of k−1, of the auxiliary information may be encoded.

The error correcting code RS(m,n,k) may be RS(248, 216, 33).

If the plurality of error correction blocks are recorded on the disc recording medium, the acquisition means may select a predetermined error correction block on the basis of the identification number and the block number recorded in the header and may acquire the auxiliary information of the selected error correction block.

If an error of the selected error correction block of the plurality of error correction blocks cannot be corrected, the acquisition means may select another error correction block having the corresponding identification number and block number.

An information reproducing method according to the present invention comprises: an acquisition step of acquiring auxiliary information proper to a disc recording medium recorded in a burst cutting area, the auxiliary information being blocked to generate error correction blocks with a header added thereto, the header containing an identification number and a block number; a reproduction step of reproducing main data from a data area; a demodulation step of demodulating the main data reproduced by the processing of the reproduction step; and a decoding step of decoding the main data demodulated by the processing of the demodulation step on the basis of the auxiliary information acquired by the processing of the acquisition step.

A program on a third recording medium according to the present invention is adapted for an information reproducing device for reproducing main data from a disc recording medium having a data area for recording the main data and a burst cutting area for recording auxiliary information, the program comprising: an acquisition step of acquiring the auxiliary information proper to the disc recording medium recorded in the burst cutting area, the auxiliary information being blocked to generate error correction blocks with a header added thereto, the header containing an identification number and a block number; a reproduction step of reproducing the main data from the data area; a demodulation step of demodulating the main data reproduced by the processing of the reproduction step; and a decoding step of decoding the main data demodulated by the processing of the demodulation step on the basis of the auxiliary information acquired by the processing of the acquisition step.

A third program according to the present invention is executable by a computer which controls an information reproducing device for reproducing main data from a disc recording medium having a data area for recording the main data and a burst cutting area for recording auxiliary information, the program comprising: an acquisition step of acquiring the auxiliary information proper to the disc recording medium recorded in the burst cutting area, the auxiliary information being blocked to generate error correction blocks with a header added thereto, the header containing an identification number and a block number; a reproduction step of reproducing the main data from the data area; a demodulation step of demodulating the main data reproduced by the processing of the reproduction step; and a decoding step of decoding the main data demodulated by the processing of the demodulation step on the basis of the auxiliary information acquired by the processing of the acquisition step.

In the first information recording device and method, recording medium and program according to the present invention, auxiliary information is blocked to generate error correction blocks with a header added thereto, the header containing an identification number and a block number, and the auxiliary information is recorded in the burst cutting area.

The disc recording medium according to the present invention has recorded in its burst cutting area, auxiliary information blocked to generate error correction blocks with a header added thereto, the header containing an identification number and a block number.

In the second information recording device and method, recording medium and program according to the present invention, auxiliary information blocked to generate error correction blocks with a header added thereto, the header containing an identification number and a block number, is acquired and main data is encrypted on the basis of the auxiliary information.

In the information reproducing device and method, recording medium and program according to the present invention, main data is decoded on the basis of auxiliary information recorded in a burst cutting area and blocked to generate error correction blocks with a header added thereto, the header containing an identification number and a block number.

BRIEF DESCRIPTION OF THE DRAWINGS

FIG. 4 illustrates the structure of BCA data.

FIG. 5 shows an example of frame sync.

FIG. 8 illustrates a recording format of a BCA code.

FIG. 9 illustrates a BCA content code.

FIG. 13 shows another structure of the ECC block.

BEST MODE FOR CARRYING OUT THE INVENTION

An embodiment of the present invention will now be described with reference to the drawings.

An embodiment of the disc recording medium according to the present invention is a next-generation optical disc which can realize a large capacity of more than 23.3 gigabytes with a diameter of 120 mm. With respect to this next-generation optical disc, a recording layer is formed on a substrate, and a transparent cover layer with a thickness of 0.1 mm is formed on the recording layer. For recording and reproducing content data, for example, a blue-violet laser beam with a wavelength of 405 nm is condensed by an optical pickup with a numerical aperture set at NA=0.85 and is cast onto the recording layer via the transparent cover layer having a thickness of 0.1 mm.

Figure 1:
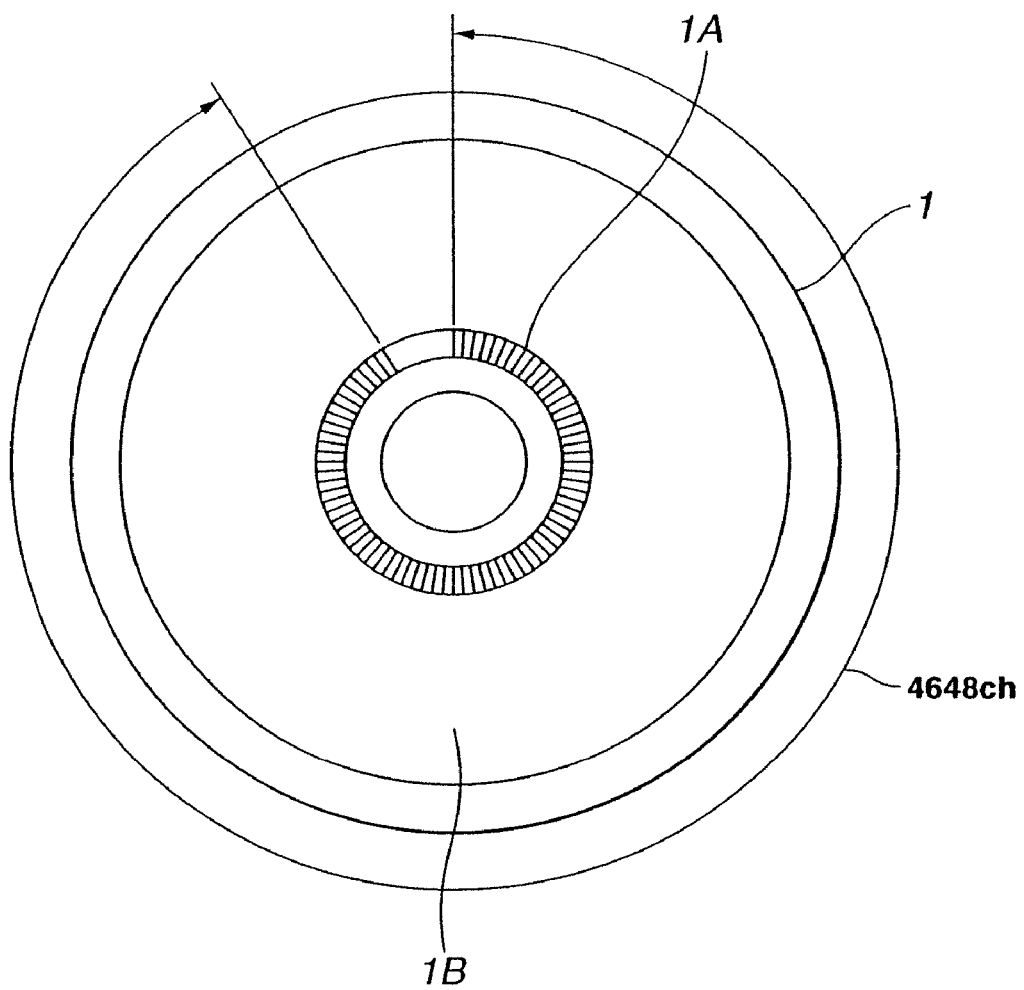
FIG. 1 shows a disc format of an optical disc to which the present invention is applied.

FIG. 1 shows the disc format of an optical disc 1 to which the present invention is applied. A burst cutting area (BCA) 1A is concentrically formed in a range from a radium of 21.3 mm to a radius of 22.0 mm on the outer side (in this example, on the inner side) of a data area 1B where content data (such as AV data) is recorded, on the inner circle of the optical disc 1. In this BCA, auxiliary information including attribute information such as disc ID information proper to the disc is recorded over 4648 channels, of 4750 channels (channel bits) per circle.

Figures 2, 3:
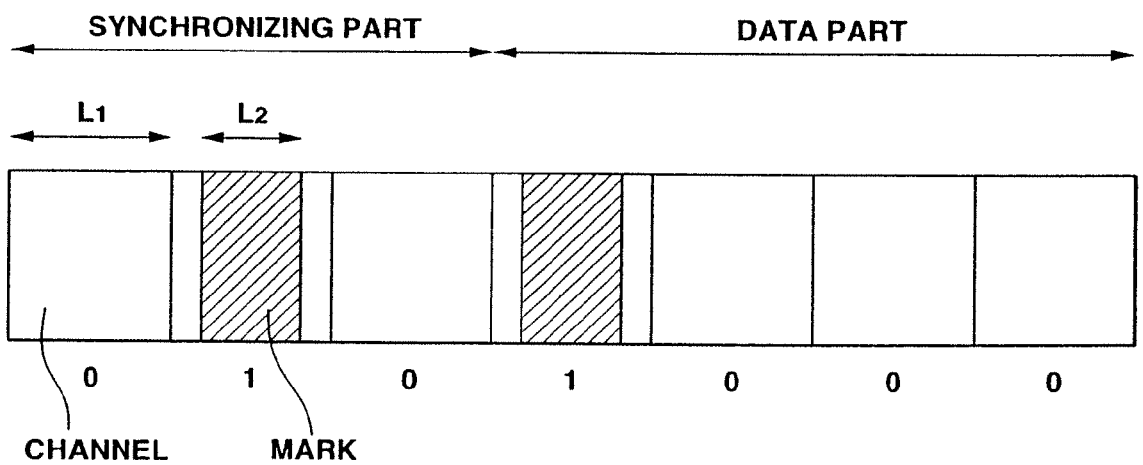
FIG. 2 illustrates 4/1 modulation.
FIG. 3 illustrates the relation between a channel and a mark.

FIG. 2 shows a modulation method for data recorded in the burst cutting area 1A. In this example, source data of 2 bits is modulated to modulation data of 7 bits. The modulation data of 7 bits is made up of a synchronizing part of 3 bits followed by a data part of 4 bits.

The synchronizing part has bits "010". In the data part, one of the 4 bits is set to "1". In the example of FIG. 2, the data part of source data "00" is set to "1000". The data part of source data "01" is set to "0100". The data part of source data "10" is set to "0010". And the data part of source data "11" is set to "0001".

Thus, in this modulation method, one of four channel bits is selected. Hereinafter, this modulation method is referred to as 4/1 modulation.

FIG. 3 schematically shows the state where a synchronizing part and a data part are recorded in the burst cutting area 1A. The length L1 (in the circumferential direction of the disc) of one channel bit is approximately 30 µm. On the other hand, in a channel bit for which "1" is recorded, a mark with a length L2 of approximately 10 to 15 µm is recorded. This mark is not formed in a channel of "0", which is simply a space.

In the example of FIG. 3, data having channel bits of "0101000" (data having channels bits corresponding to the source data "00" in FIG. 2) is presented.

FIG. 4 shows the data structure of the data recorded in the burst cutting area 1A. As shown in FIG. 4, each frame (line) is made up of 5 bytes. The leading 1 byte of each frame is a frame sync and the 4 bytes following the frame sync constitute data.

The frame sync of the first frame is set to $SB_{BCA,-1}$ and the data is a preamble. All the value of the preamble is 00 h. Using this preamble, a channel clock is generated by a PLL, which will be described later.

Since the frame sync $SB_{BCA,-1}$ of the first frame has a unique value, the start position of the BCA code can be detected by using this frame sync. Alternatively, both the frame sync $SB_{BCA,-1}$ and the subsequent preamble can be detected as the start position of the BCA code.

The second to 33$^{rd}$ frames are sectioned by four frames each. As the data of the second to fifth frames, user data $I_{0,0}$ to $I_{0,15}$ of 16 bytes are arranged. In the subsequent sixth to ninth frames, parities $C_{0,0}$ to $C_{0,15}$ of 16 bytes corresponding to the user data $I_{0,0}$ to $I_{0,15}$ of the second to fifth frames are arranged.

One ECC block is constituted on the basis of the user data of the second to fifth frames and the parity data of the sixth to ninth frames.

Similarly, user data $I_{1,0}$ to $I_{1,15}$ are arranged in the 10$^{th}$ to 13$^{th}$ frames and parities $C_{1,0}$ to $C_{1,15}$ corresponding to the user data are arranged in the 14$^{th}$ to 17$^{th}$ frames. User data $I_{2,0}$ to $I_{2,15}$ are arranged in the 18$^{th}$ to 21$^{st}$ frames and corresponding parities $C_{2,0}$ to $C_{2,15}$ are arranged in the 22$^{nd}$ to 25$^{th}$ frames. User data $I_{3,0}$ to $I_{3,15}$ are arranged in the 26$^{th}$ to 29$^{th}$ frames and corresponding parities $C_{3,0}$ to $C_{3,15}$ are arranged in the 30$^{th}$ to 33$^{rd}$ frames.

The frame syncs of the second to fifth frames are set to $SB_{BCA,0}$. The frame syncs of the sixth to ninth frames are set to $SB_{BCA,1}$. The frame syncs of the 10$^{th}$ to 13$^{th}$ frames are set to $SB_{BCA,2}$. The frame syncs of the 14$^{th}$ to 17$^{th}$ frames are set to $SB_{BCA,3}$. The frame syncs of the 18$^{th}$ to 21$^{st}$ frames are set to $SB_{BCA,4}$. The frame syncs of the 22$^{nd}$ to 25$^{th}$ frames are set to $SB_{BCA,5}$. The frame syncs of the 26$^{th}$ to 29$^{th}$ frames are set to $SB_{BCA,6}$. The frame syncs of the 30$^{th}$ to 33$^{rd}$ frames are set to $SB_{BCA,7}$.

The frame sync of termination of the 34$^{th}$ frame is set to $SB_{BCA,-2}$. The 34$^{th}$ frame has no data arranged therein and only has the frame sync.

The data of FIG. 4 represents data before being 4/1-modulated in accordance with the modulation method of FIG. 2. The total quantity of data is 166 (=5×4×8+5+1) bytes. As a result of modulating the data of 166 bytes by 4/1 modulation shown in FIG. 2, 4648 (=166×8×7/2) channel bits are provided (FIG. 1).

FIG. 5 shows a specific example of the frame syncs shown in FIG. 4. The example shown in FIG. 5 represents the structure of channel bits after being 4/1-modulated.

A frame sync of 28 channel bits is made up of a sync body of 14 channel bits and sync ID of 14 channel bits.

The sync body of 14 channel bits is made up of a sync body 1 of 7 channel bits and a sync body 2 of 7 channel bits. The sync ID of 14 channel bits is made up of sync ID 1 of 7 channel bits and sync ID 2 of 7 channel bits.

The sync body has an out-of-rule pattern of 4/1 modulation. Specifically, as shown in FIG. 2, in the case of 4/1 modulation, the value of the synchronizing part is set to "010". However, the synchronizing part of the sync body 2 is not "010" but "001". Therefore, it is possible to easily identify the frame sync from the data.

The sync body 1 of each frame sync is set to "010 0001" and the sync body 2 is set to "001 0100".

On the other hand, the sync IDs of the respective frame syncs have different values, thus making it possible to identify the frame syncs from each other.

Specifically, in the example of FIG. 5, the sync ID of $SB_{BCA,-1}$ of the preamble and the sync ID of the frame sync $SB_{BCA,-2}$ of the termination are set to "010 0001". Therefore, the preamble and the termination can be easily identified from the other frames. Since the sync ID 2 of the preamble frame has a value "010 0001" and the sync ID 2 of the terminal frame has a value "010 0010", the preamble frame and the termination frame can be identified from each other.

Moreover, the frame syncs of the other frames can be identified from one another because they have different values, as shown in FIG. 5.

Figure 6:
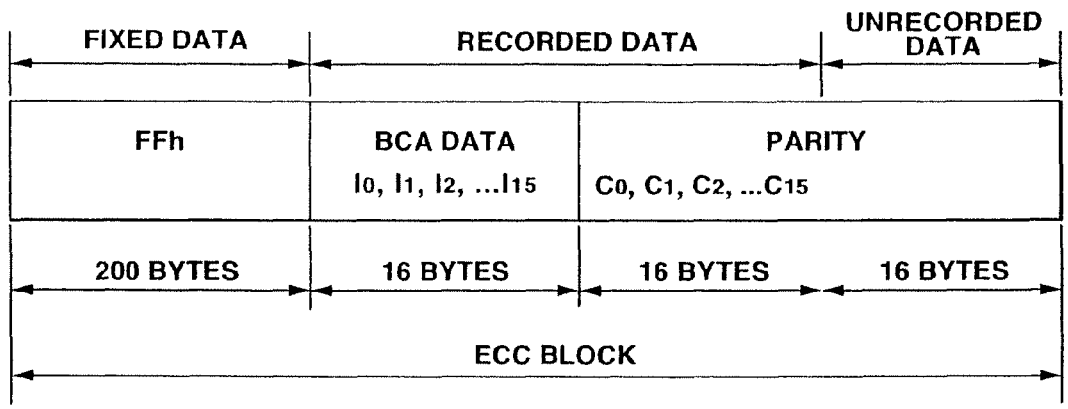
FIG. 6 illustrates the structure of an ECC block in a burst cutting area.

FIG. 6 shows the structure of an ECC block of a BCA code constituted as shown in FIG. 4. Specifically, a Reed-Solomon code of RS(248,216,33) is used as an ECC code. The code has a code length m of 248 bytes (symbols), a data length n of 216 bytes (symbols) and a distance of 33 bytes (symbols).

This ECC block of the BCA code is constituted similarly to an ECC block of content data, which is main data recorded in the data area 1B shown in FIG. 1.

Figure 7:
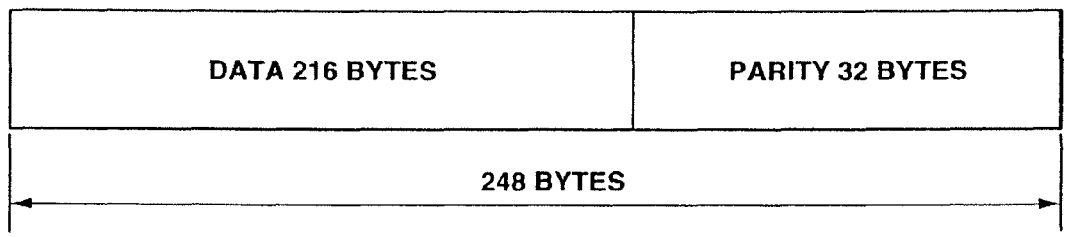
FIG. 7 illustrates the structure of an ECC block in a data area.

Specifically, as the ECC block in the data area 1B, again, a Reed-Solomon code of RS(248,216,33) is used, as shown in FIG. 7.

However, in the ECC block of the BCA code, the leading 200 bytes (symbols) of the data length n of 216 bytes are fixed data, and an arbitrary value such as FFh is used, as shown in FIG. 6. The 16 bytes (symbols) $I_0$ to $I_{15}$ after the fixed data are user data substantially constituting the BCA data.

Although the BCA data is arranged at the trailing end of the 216 bytes (symbols) in FIG. 6, it may be arranged at the leading end.

Using the fixed data of 200 bytes and the BCA data of 16 bytes, parities of 32 bytes are calculated. If the fixed data of 200 bytes does not exist, the parities of 32 bytes cannot be calculated. Since the fixed data of 200 bytes is thus used as the base for calculating the parity, it is not simply stuffing data.

Moreover, in the present invention, only the parities $C_0$ to $C_{15}$ of the leading 16 bytes are recorded on the optical disc 1 and the parities of the remaining 16 bytes are not recorded.

Of the data of 216 bytes (symbols), the fixed data of 200 bytes is not recorded and only the BCA data of 16 bytes is recorded. After all, of the ECC block of 248 bytes, only the BCA data of 16 bytes and the parities of 16 bytes, that is, a total of 32 bytes (symbols), are recorded.

As a result, the error correction performance corresponds to the error correction performance of RS(32,16,17).

In decoding, the same value is used as it is for the fixed data of 200 bytes. The unrecorded parities of 16 bytes are decoded as pointer erasure. That is, of the parities of 32 bytes, the parities of the latter 16 bytes are processed as having been erased. Even if a half of the parities are erased, their positions are known and therefore the original parities can be decoded.

By thus using the same RS(248, 216, 33) as the ECC of the main data recorded in the data area 1B, very high error correction capability can be realized for the BCA code in the burst cutting area 1A. Since ECC processing of the BCA code can be carried out by using the same hardware as for the ECC of the main data in the data area 1B, simplification of the structure and reduction in cost can be realized. Moreover, since it suffices to record only 32 symbols, the scanning density can be increased in comparison with the case of recording all the 248 symbols and the detection is made easier, thus improving the reliability. It is also possible to record a large volume of data (disc ID).

FIG. 8 shows the structure of the ECC block of the BCA. As shown in FIG. 8, in the present invention, four ECC blocks are recorded in the burst cutting area 1A.

Data of 16 bytes of each ECC block is made up of a header of leading 2 bytes followed by content data of 14 bytes. The header is made up of a BCA content code of 1 byte and a content data length of 1 byte.

In the BCA content code, 6 bits from a leading bit 7 to a bit 2 constitute application ID, and 2 bits, that is, the last bit 1 and a bit 0, constitute the block number, as shown in FIG. 9.

The optical disc recording/reproducing device is capable of recording and reproducing data to and from only an optical disc provided with the BCA code having application ID set in advance. For example, data necessary to protect content data (such as key information for encrypting/decrypting content data or disc ID) can be recorded to the BCA code having specific application ID.

The block number is one of four numbers "00", "00", "10" and "11".

If the content data of every ECC block has 14 bytes or less, every ECC block has the block number "00".

On the other hand, if the same content data is recorded, for example, as the content data of each of the leading two ECC blocks of the four ECC blocks (that is, if the same content data having the same application ID is double-written), each of the two ECC blocks has the block number "00". That is, in case of recording the same content data, the block number of the two ECC blocks are the same number.

If content data having different application ID from the application ID of the first two ECC blocks is recorded consecutively throughout 24 bytes in the remaining (latter) two ECC blocks, the first ECC block of the latter two ECC blocks has the block number "00" and the second ECC block has the block number "01". That is, in case of recording content data over a plurality of ECC blocks, the block number of each ECC block is the serial number. Each of the latter two ECC blocks has a content data length with a value of 24 bytes (which is the actual length of the user data).

On contrary, if the same content data is double-written, each of the ECC blocks have a content data length of 14 bytes (fixed length).

If the content data is less than 14 bytes, stuffing data is added and each ECC block has a content data size of 14 bytes (fixed length).

Since the application ID and the block number are thus recorded in each ECC block, it can be identified which ECC block has desired data stored therein and whether the content data is multiple-written or singly written.

The BCA content code, the content data length and the content data (16 bytes) of the leading ECC block of FIG. 8 correspond to $I_{0,0}$ to $I_{0,15}$ (16 bytes) of the leading ECC block of FIG. 4. Similarly, the BCA content codes, the content data length and the content data of the second to fourth ECC blocks of FIG. 8 correspond to $I_0$ to $I_{15}$ of the second to fourth ECC blocks of FIG. 4, respectively.

Figure 10:
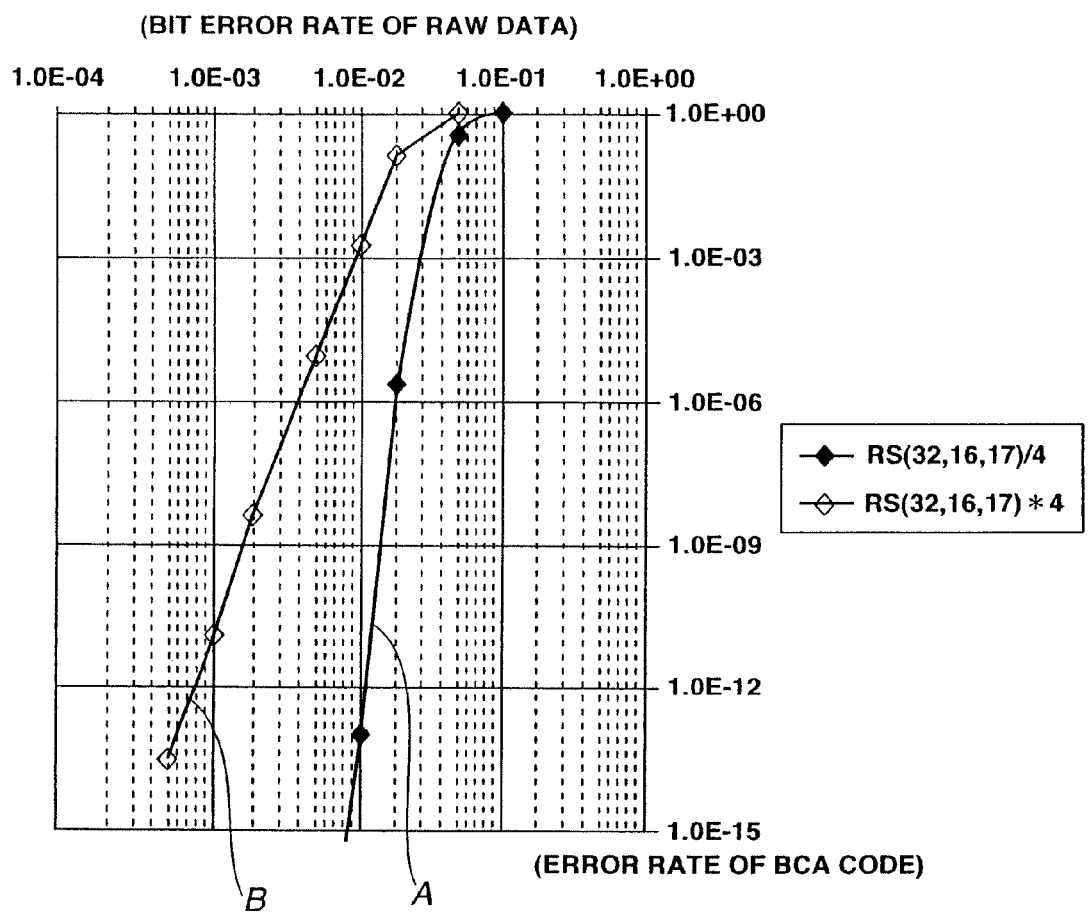
FIG. 10 shows the relation between a bit error rate of raw data and an error rate of a BCA code.

FIG. 10 shows the error correction capability of the BCA code. In FIG. 10, a curve A represents the error rate in the case where the same data is recorded in each of four ECC blocks (quadruple writing), and a curve B represents the error rate of an error generated in one of four ECC blocks in the case where different data are recorded in the four ECC blocks (single writing).

As the optical disc 1 with the cover layer having a thickness of 0.1 mm is inserted in the cartridge and the degree of adherence of dust particles is examined, the adherence of dust particles is found in approximately 0.1% of the entire area. Thus, the error rate of the BCA code with respect to the bit error rate of 0.1% ($=1E-3=1\times10-3$) is approximately $1.0\times E-12$ for the curve B, and a much smaller value for the curve A.

In FIG. 10, the horizontal axis represents the bit error rate of raw data and the vertical axis represents the error rate of the BCA code.

Figure 11:
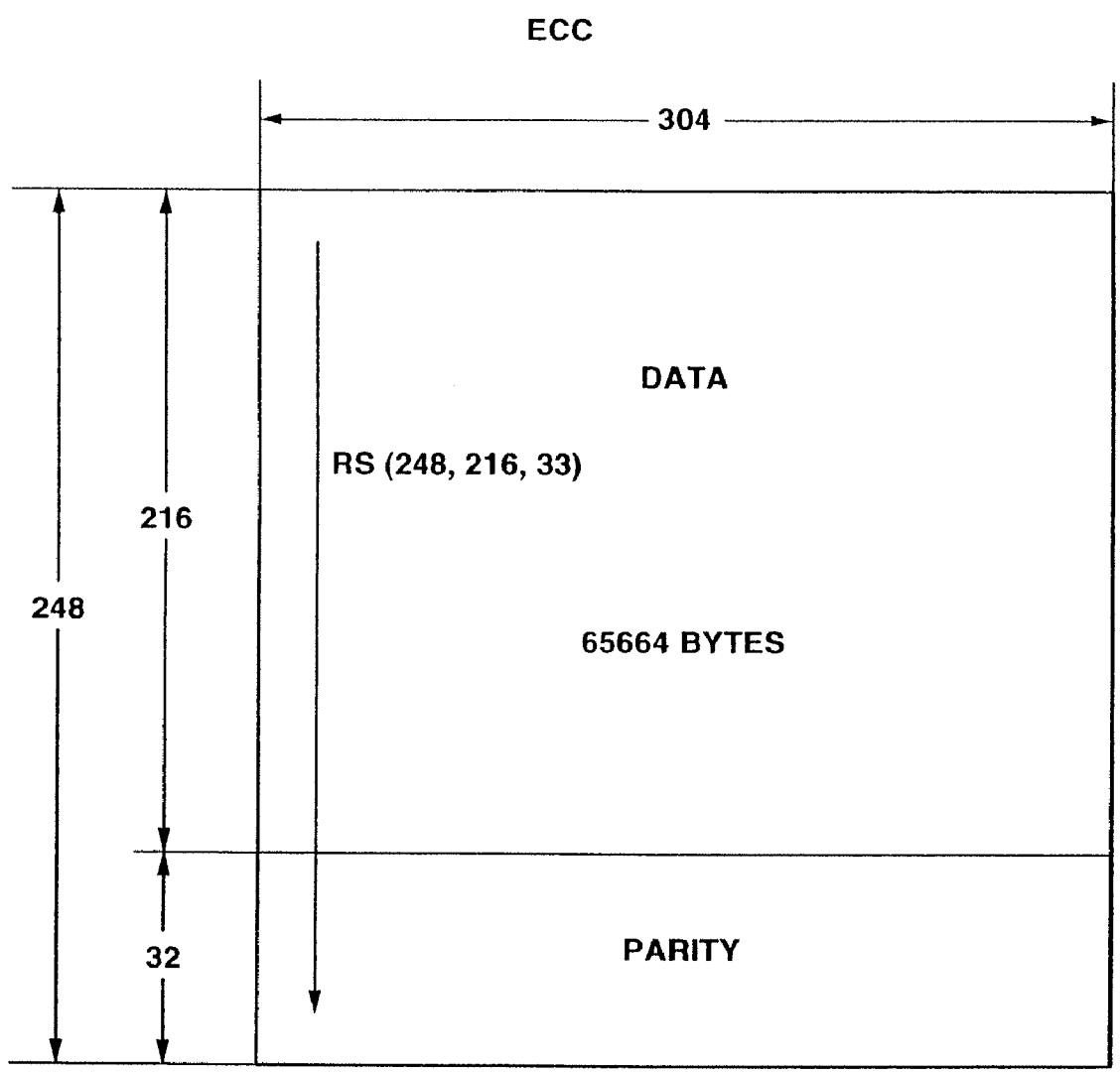
FIG. 11 illustrates the structure of an ECC block of 64 kilobytes in the data area.

The error correction block of main data (content data) such as AV data recorded in the data area 1B is constituted by a 64-kilobyte unit, as shown in FIG. 11. By thus expanding the structure of the ECC block, the interleave length can be increased and higher resistance to burst errors is provided.

In this case, the unit of recording and reproduction may be a 2-kilobyte sector unit. While recording or reproducing data with an error correction block of a 64-kilobyte unit, a desired 2-kilobyte sector is recorded or reproduced therefrom.

The error correcting code is RS(248,216,33) and one error correction block is made up of 304 correcting codes.

If an error detecting code (EDC) of 4 bytes is added to data of 2 kilobytes ($=2048$ bytes), the total quantity of data is 2052 bytes. On the assumption that one sector is made up of data of 2052 bytes, 32 2-kilobyte sectors can be formed in the error correction block of 64 kilobytes as a unit. Therefore, the quantity of data of the error correction block of 64 kilobytes is 65664 ($=2052\times32$) bytes.

Figure 12:
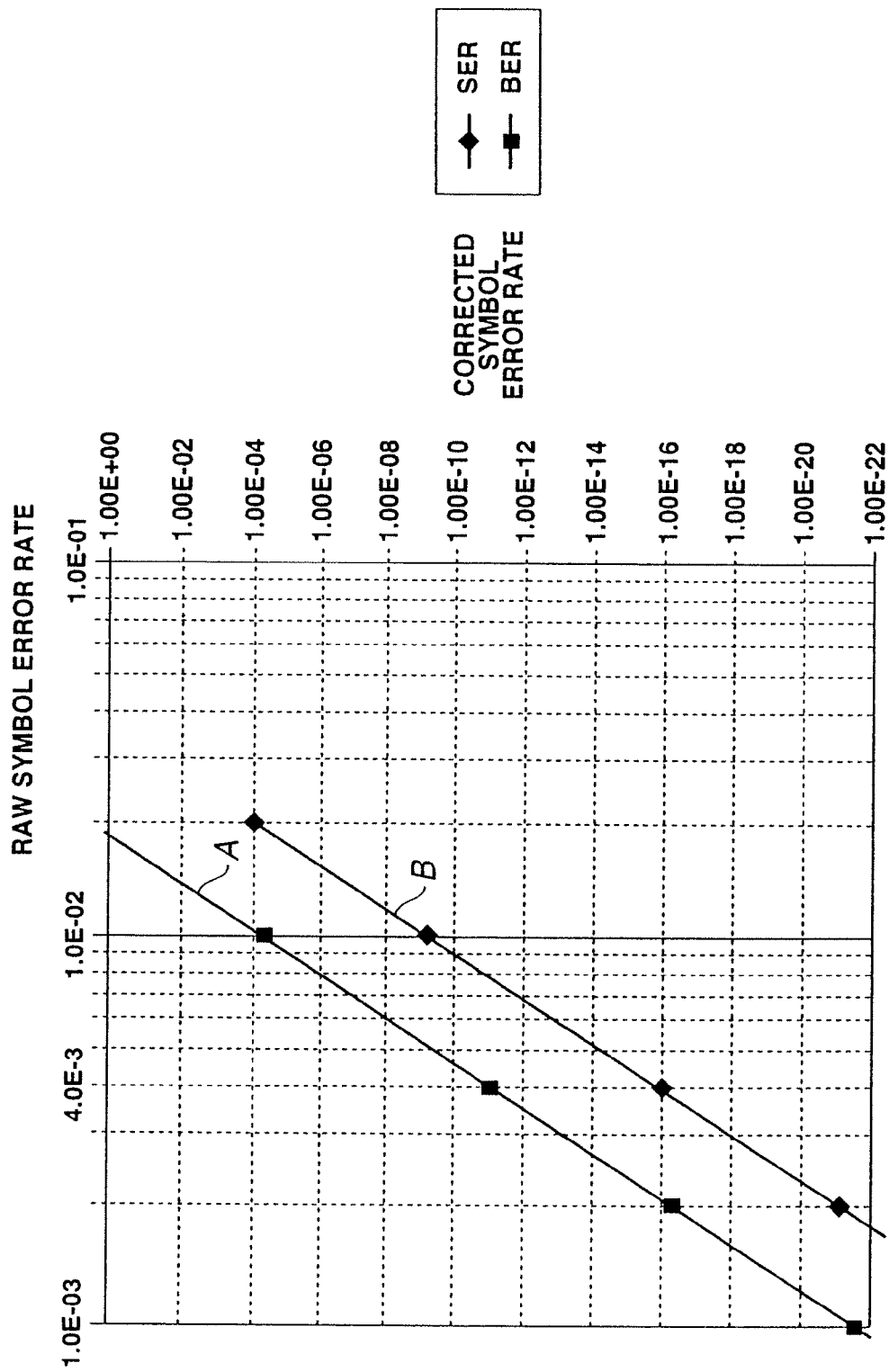
FIG. 12 shows the relation between a raw symbol error rate and a corrected symbol error rate.

A curve A in FIG. 12 represents the block error rate of a 64-kilobyte unit as shown in FIG. 11, and a curve B represents the symbol error rate. In FIG. 12, the horizontal axis represents the raw symbol error rate and the vertical axis represents the corrected symbol error rate.

When the raw symbol error rate on the horizontal axis of FIG. 12 is at a value of 4.0E−3, the value of the corrected symbol error rate is found to be approximately 1.0E−16 from the curve B. This symbol error rate of 1.0E−16 is a value which realizes an almost error-free state (where no errors occur). At this point, the block error rate of the 64-kilobyte ECC block is approximately 7E−12.

The values of the error rate shown in the graph of FIG. 10 are close to or sufficiently smaller than the value of the error rate represented by the block error rate of the curve A in FIG. 12. That is, by carrying out the above-described ECC block processing, an error rate substantially equal to the error rate in the data area 1B can be also realized in the burst cutting area 1A.

While four ECC blocks are recorded in the burst cutting area 1A in the above-described example, it may be conceivable to record one ECC block, as shown in FIG. 13.

However, in the case where the number of ECC blocks is one, as shown in FIG. 13, multiple writing of disc ID and recording of different disc IDs cannot be performed. If there is no need to perform multiple writing or recording of a plurality of disc IDs, the number of ECC blocks may be one.

Giving an example of recording the disc ID information, a disc recording device 11 for recording information in the burst cutting area 1A and ultimately forming the optical disc 1 will now be described with reference to FIG. 14.

Figure 14:
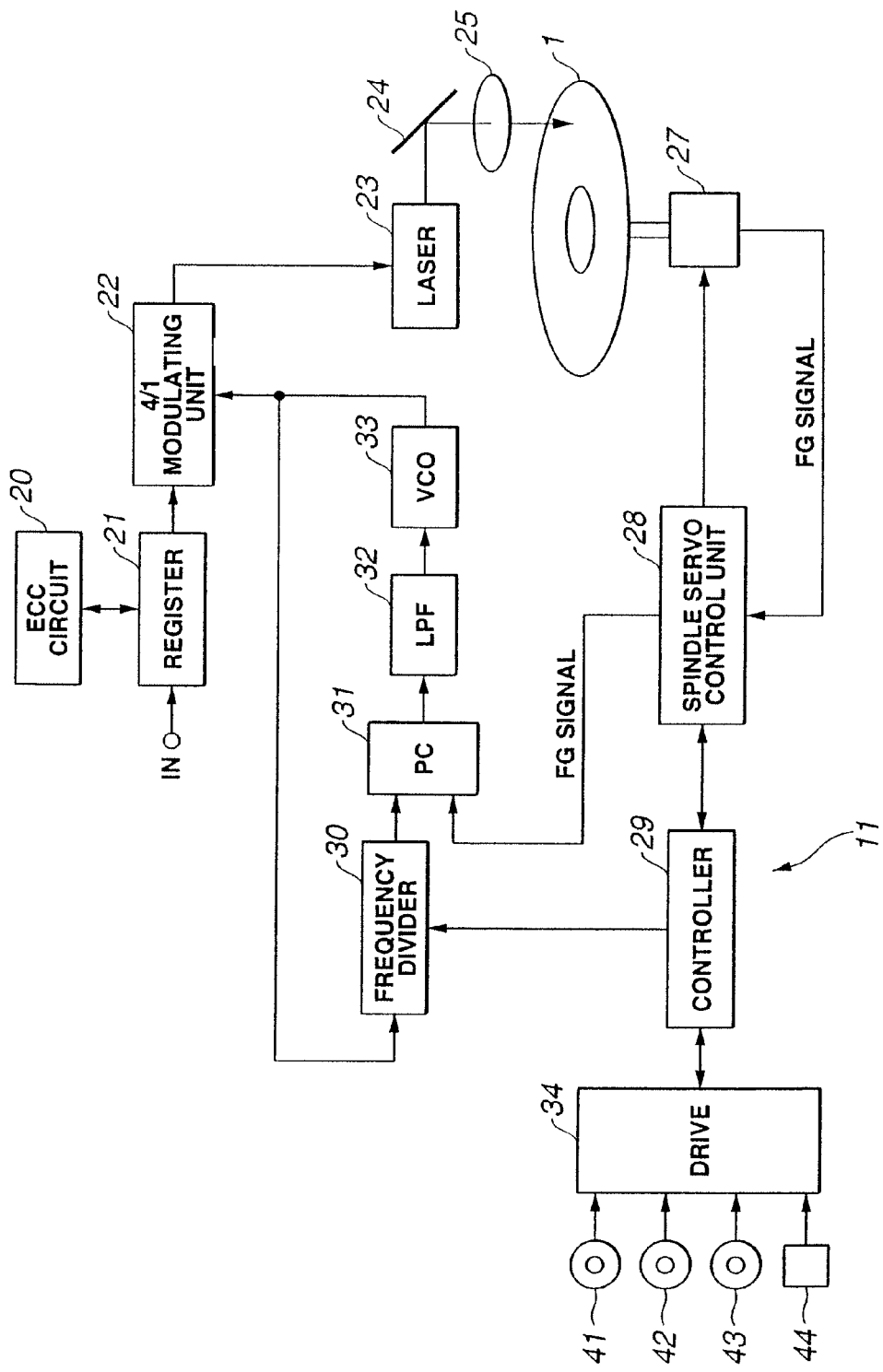
FIG. 14 is a block diagram showing the structure of a disc recording device for recording a BCA code into the burst cutting area.

In FIG. 14, the disc ID information inputted via an input terminal IN is stored in a register 21. The register 21 is connected with an ECC (error correcting code) circuit 20. The ECC circuit 20 generates an error correcting code of a format shown in FIGS. 4 and 8 from the disc ID information stored in the register 21. The disc ID information which is error correcting coded by the ECC circuit 20 is supplied to a 4/1 modulating unit 22.

The 4/1 modulating unit 22 performs 4/1 modulation on the disc ID information read out from the register 21 in accordance with a clock (channel clock) inputted from a VCO (voltage-controlled oscillator) 33, the inserts a frame sync signal and the like to generate data to be recorded in the burst cutting area 1A of the optical disc 1, and outputs the generated data to a laser 23.

The 4/1 modulation by the 4/1 modulating unit 22 is already described with reference to FIG. 2.

The laser 23 is, for example, a YAG laser or the like and casts a high-output laser beam onto the optical disc 1 via a mirror 24 and an objective lens 25. The objective lens 25 includes, for example, a cylindrical lens and casts the incident laser beam onto the burst cutting area 1A of the optical disc 1. Thus, the reflection film of the optical disc 1 is irreversibly changed and the disc ID information is recorded thereon.

A spindle motor 27 rotates the optical disc 1 under the control of a spindle servo control unit 28, and the spindle motor 27 causes an FG (frequency generator) signal generator to generate an FG signal as a pulse every time the optical disc 1 (spindle motor 27) rotates by a predetermined angle and outputs the FG signal to the spindle servo control unit 28. The spindle servo control unit 28, under the control of a controller 29, controls the spindle motor 27 so that the spindle motor 27 rotates at a predetermined rotation speed, on the basis of the FG signal inputted from the spindle motor 27. The spindle servo control unit 28 also outputs the FG signal inputted from the spindle motor 27, to the controller 29 and a PC (phase comparator) 31.

The controller 29 controls the spindle servo control unit 28 in accordance with an operation signal inputted from an operating unit, not shown, thus driving the spindle motor 27 and rotating the optical disc 1. The controller 29 also generates a control signal for controlling the frequency division ratio of a frequency divider 30 on the basis of the FG signal inputted from the spindle servo control unit 28 and outputs the control signal to the frequency divider 30.

The frequency divider 30, the PC 31, a LPF (low-pass filter) 32 and the VCO 33 constitute a PLL (phase-locked loop).

The frequency divider 30 divides the frequency of the clock outputted from the VCO 33 to a value 1/N (frequency division ratio) set on the basis of the control signal inputted from the controller 29 and outputs the clock to the PC 31. The PC 31 compares the phase of the clock inputted from the frequency divider 30 with the phase of the FG signal inputted from the spindle servo control unit 28 and thus generates and outputs a phase difference signal to the LPF 32. The LPF 32 removes a high-frequency component from the inputted signal and outputs the resultant signal to the VCO 33. The VCO 33 changes the phase (frequency) of the clock to be oscillated and outputted, on the basis of the voltage applied to the control terminal (that is, the output from the LPF 32).

The clock outputted from the VCO 33 is inputted to the 4/1 modulating unit 22 and also inputted to the frequency divider 30, and the VCO 33 is controlled so that the phase difference between the output of the frequency divider 30 and the FG signal outputted from the spindle servo control unit 28 is constant. Therefore, the output of the VCO 33 is a signal synchronously oscillating with a frequency which is N times that of the FG signal. The 4/1 modulating unit 22 outputs to the laser 23 the data of the format described above with reference to FIGS. 4 and 8, in accordance with the clock inputted from the VCO 33.

The controller 29 is connected with a drive 34. On the drive 34, a magnetic disk 41, an optical disc 42, a magneto-optical disc 43 or a semiconductor memory 44 is appropriately loaded. The drive 34 reads out, for example, a necessary computer program and supplies it to the controller 29.

Figure 15:
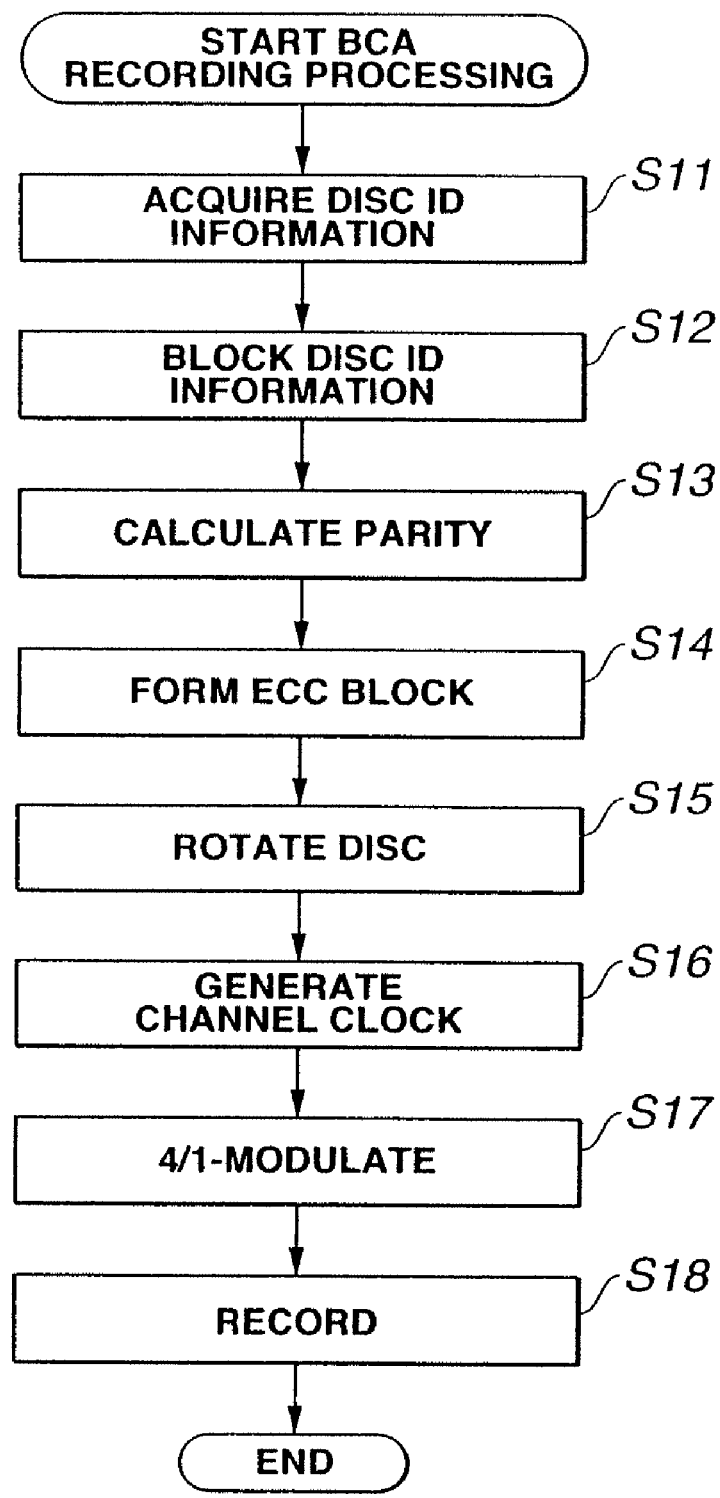
FIG. 15 is a flowchart for explaining BCA recording processing at the disc recording device of FIG. 14.

The operation of the disc recording device will now be described with reference the flowchart of FIG. 15. At step S11, the register 21 acquires disc ID information from the input terminal IN and stores it. At step S12, the ECC circuit 20 codes the disc ID information for four blocks by using RS(248,216,33), which is a Reed-Solomon code, as described above with reference to FIGS. 4 and 8. The ECC circuit 20 calculates parities at step S13 and forms ECC blocks at step S14. Specifically, error correcting coding is performed on the disc ID information by using a code which uses RS(248,216,33) per block and has a long distance 33 with respect to the number of data 216, that is, a long distance code (LDC). Coding is performed with an inter-symbol distance which is achieved by increasing the proportion of the number of parities to the number of data and thus improving the error correction capability. Moreover, since the above-described RS(248,216,33) is multiple-written for four blocks at the most, the error correction capability is improved further.

The disc ID information recorded in the burst cutting area 1A of the optical disc 1 relates to the entire data on the disc (for example, whether or not the encrypted content data recorded in the data area 1B of the optical disc 1 may be decrypted and reproduced is determined). To this end, the disc ID information requires high reliability. Therefore, coding with high error correction capability must be performed on the disc ID information, as described above. The error correction capability is equivalent to or higher than the error correction capability of error correcting coding performed on the content data recorded in the data area 1B, as described above.

When the start of recording is commanded, the controller 29 at step S15 controls the spindle servo control unit 28 to rotate the spindle motor 27 at a constant angular velocity (CAV). The spindle motor 27 generates an FG signal corresponding to the rotation and supplies the FG signal to the spindle servo control unit 28. The spindle servo control unit 28 supplies the FG signal to the PC 31.

At step S16, a channel clock is generated. Specifically, the PC 31 compares the phases of two input signals with each other and supplies a resultant phase different signal to the VCO 33 via the LPF 32. The VCO 33 generates a channel clock having a phase and frequency corresponding the signal (controlled voltage) supplied from the LPF 32. The clock outputted from the VCO 33 is supplied to the frequency divider 30, where the clock is frequency-divided by a predetermined frequency division ratio set via the controller 29 and the frequency-divided clock is supplied to the PC 31.

In the above-described manner, the VCO 33 performs PLL so as to realize synchronization with one rotation of the optical disc 1, and thus generates and outputs a channel clock having a frequency which is N times the frequency of the FG signal from the spindle motor 27.

For example, if the frequency of the FG signal per rotation is 50 and the value of the frequency division ratio 1/N at the frequency divider 30 is 1/95, a channel clock having 1/4750 cycles, which is 1/(50×95) of the time of one rotation of the spindle motor 27 (optical disc 1), is generated.

At step S17, the 4/1 modulating unit 22 performs 4/1 modulation on the disc ID information to which the error correcting code is added by the ECC circuit 20, on the basis of the channel clock supplied from the VCO 33, and supplies the 4/1-modulated data to the laser 23. At step S18, the laser 23 generates a laser beam on the basis of the data (recorded channel bits) supplied from the 4/1 modulating unit 22 and casts the laser beam onto the optical disc 1 via the mirror 24 and the objective lens 25. In this manner, at the time of shipment from the plant, the disc ID information is recorded, for example, concentrically, over a plurality of tracks in the burst cutting area 1A of the optical disc 1.

When the duty of the mark of the recorded channel bits is to be lowered, for example, when only 10 μm of the channel bit length of 30 μm is to be used as the mark (FIG. 3), the VCO 33 is oscillated at a frequency which is three times that of the channel clock so that only one of three clocks equivalent to the channel bits may be used as the mark.

In the burst cutting area 1A of the optical disc 1, the same disc ID information is entered for four blocks, as described above. By doing so, the information can be obtained even when one of the four blocks cannot be read. In the case of quadruple writing, even when a large dust particle is adhered over two codes (blocks), the other two blocks are available and therefore an error can be corrected. Alternatively, different disc ID information is recorded in two or more blocks. By doing so, it is possible to manage the same optical disc 1 by four types of different applications at the maximum.

Figure 16:
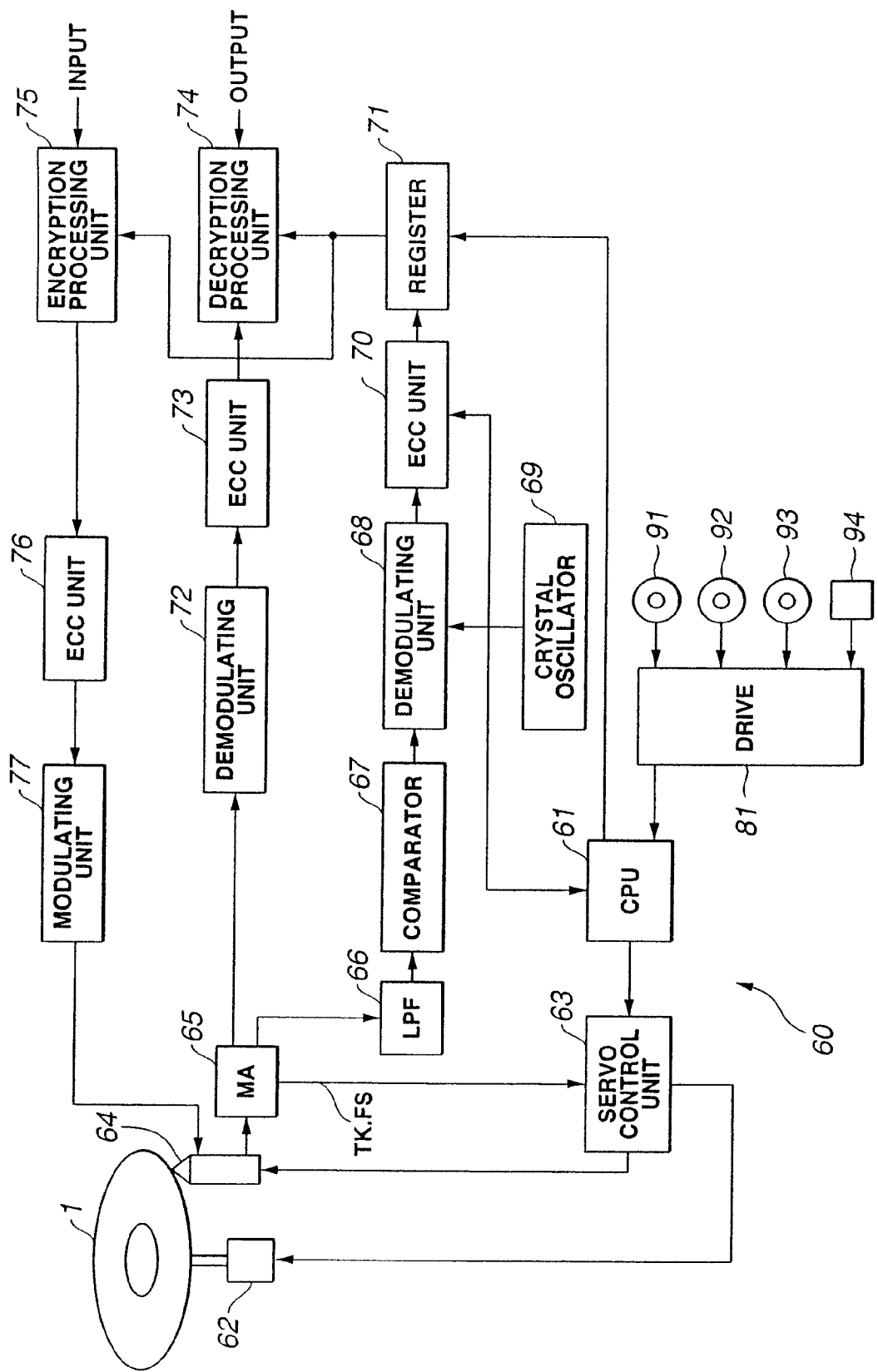
FIG. 16 is a block diagram showing the structure of a disc recording/reproducing device to which the present invention is applied.

FIG. 16 is a block diagram showing the structure of a disc recording/reproducing device 60 for recording main data into the data area 1B of the optical disc 1 which has the disc ID information recorded in its burst cutting area 1A as described above, and for reproducing the recorded main data.

A CPU 61 controls each part of the disc recording/reproducing device 60 in accordance with an operation signal inputted from an operating unit, not shown, in order to record main data into the data area 1B of the optical disc 1 and reproducing the recorded main data. When reproducing or recording data, the CPU 61 causes the disc ID information on the optical disc 1 held by a register 71 to be outputted to a decryption processing unit 74 or an encryption processing unit 75, and generates and outputs a control signal for instructing rotation or stop of the optical disc 1 to a servo control unit 63.

The servo control unit 63 causes an optical pickup 64 to seeks a predetermined position on the optical disc 1 on the basis of the control signal inputted from the CPU 61, and carries out tracking control and focusing control of the optical pickup 64 on the basis of a tracking error signal (TK) and a focusing error signal (FS) supplied from a matrix amplifier (MA) 65. A spindle motor 62 rotates the optical disc 1 at a predetermined rotation speed under the control of the servo control unit 63.

In reproducing the disc ID information, the servo control unit 63 rotates the optical disc 1 in accordance with the CAV (constant angular velocity) mode. In recording and reproducing the main data, the servo control unit 63 rotates the optical disc 1 in accordance with the CLV (constant linear velocity) mode.

The optical pickup 64 is held by a predetermined thread mechanism so that is movable in the radial direction of the optical disc 1. When the data recorded on the optical disc 1 is to be recorded, the optical pickup 64 casts a laser beam onto the optical disc 1 in accordance with a control signal inputted from the servo control unit 63, then receives its reflected beam, converts it to an electric signal, and outputs the signal to the matrix amplifier 65. When new data is to be recorded onto the optical disc 1, the optical pickup 64 casts a laser beam onto the optical disc 1 on the basis of data outputted from a modulating unit 77 and causes the data to be recorded in the data area 1B of the optical disc 1.

The matrix amplifier 65 processes the signal inputted from the optical pickup 64 and outputs a reproduced signal of the data corresponding to the disc ID information recorded in the burst cutting area 1A to a LPF 66. The matrix amplifier 65 also generates a tracking error signal with its signal level changed in accordance with the quantity of tracking errors and a focusing error signal with its signal level changed in accordance with the quantity of focusing errors, then outputs the tracking error signal and the focusing error signal to the servo control unit 63, and outputs a reproduced signal of the data recorded in the data area 1B to a demodulating unit 72.

The LPF 66 restrains the variance in the reproduced signal due to noise by removing a high-frequency component from the inputted signal and outputs the resultant signal to a comparator 67. The comparator 67 compares the inputted signal with a predetermined level, thereby binarizing the signal. A demodulating unit 68 samples the inputted signal on the basis of a sampling clock inputted from a crystal oscillator 69, performs channel position correction and demodulation (in this case, 4/1 demodulation) on the signal, and outputs the resultant signal to an ECC unit 70. The number of sampling clocks is a numerical value based on the disc ID recording format. The ECC unit 70 performs error correction processing on the inputted demodulated data (disc ID information) on the basis of the error correcting code (RS(248,216,33)) contained in the disc ID information and causes the register 71 to store the error-corrected disc ID information. The ECC unit 70 and an ECC unit 73, which will be described later, may be a single common ECC unit.

Meanwhile, the demodulating unit 72 demodulates the data (content data) supplied from the matrix amplifier 65 and supplies the demodulated data to the ECC unit 73. The ECC unit 73 performs error correction on the inputted demodulated data (for example, coded by RS(248,216,33)) by using 32 parities and then supplies the error-corrected data to the decryption processing unit 74. The decryption processing unit 74 decrypts the content data supplied from the ECC unit 73 on the basis of the disc ID information supplied from the register 71 and outputs the decrypted data to a device, not shown.

The encryption processing unit 75 encrypts content data inputted for recording on the basis of the disc ID information supplied from the register 71 and outputs the encrypted data to an ECC unit 76. The ECC unit 76 codes the inputted encrypted data by using RS(248,216,33) and outputs the coded data to the modulating unit 77.

In a drive 81, a magnetic disc 91, an optical disc 92, a magneto-optical disc 93 or a semiconductor memory 94 is loaded, when necessary. The drive 81 supplies a program read out from the medium to the CPU 61.

Figure 17:
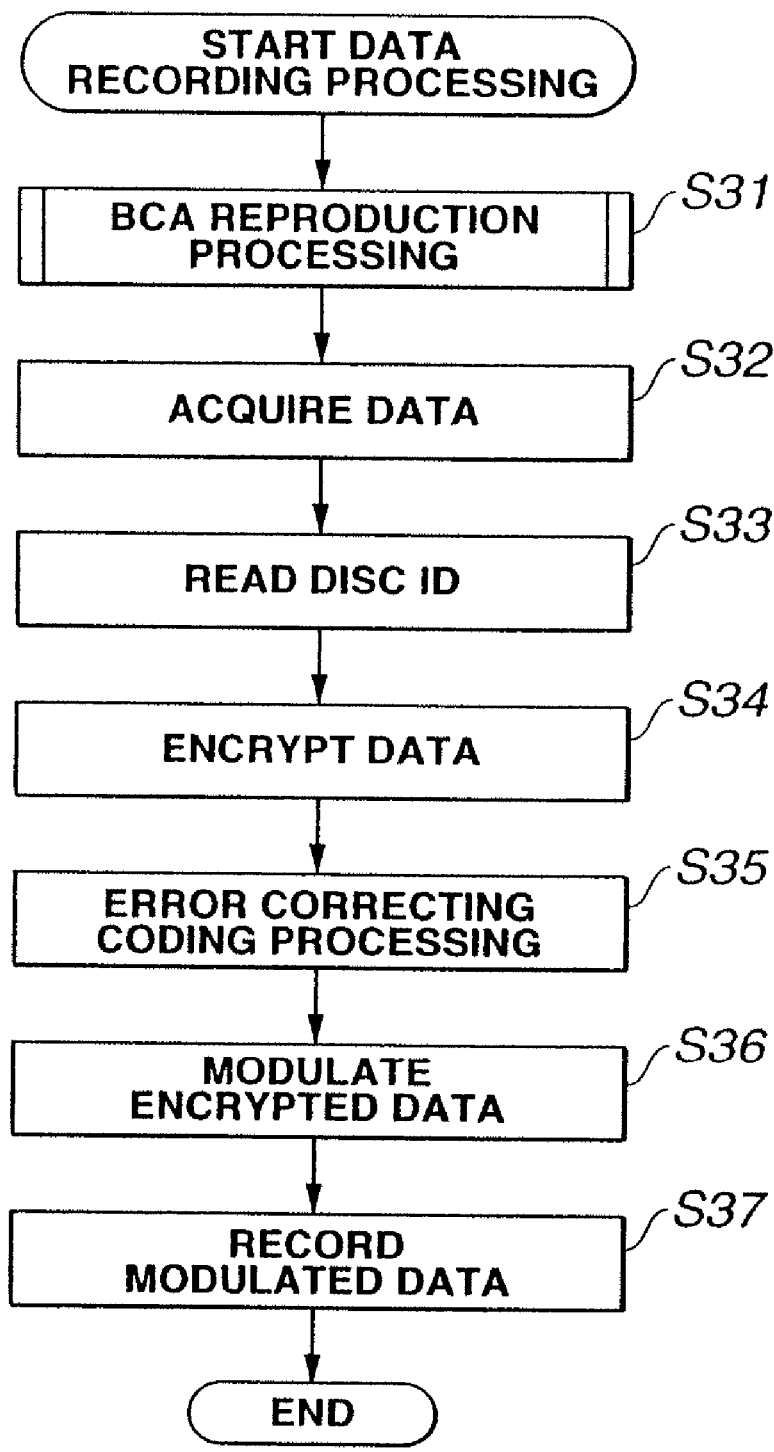
FIG. 17 is a flowchart for explaining data recording processing at the disc recording/reproducing device of FIG. 16.
Figure 18:
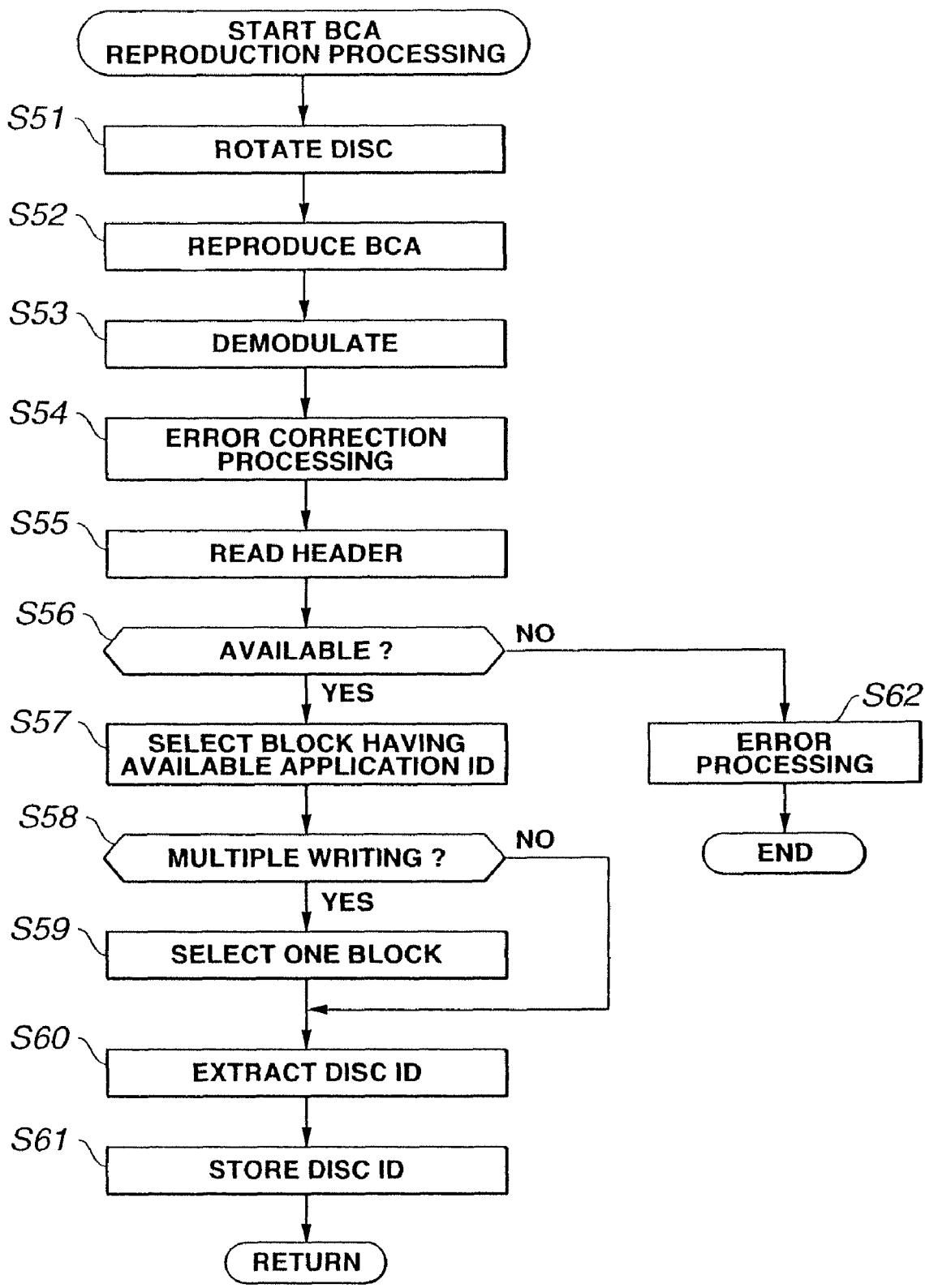
FIG. 18 is a flowchart for explaining the details of BCA reproduction processing at step S31 of FIG. 17.

The operation in data recording will now be described with reference to FIG. 17. When the optical disc 1 is loaded in the disc recording/reproducing device, the CPU 61 executes BCA reproduction processing at step S31. This BCA reproduction processing is described in detail in FIG. 18.

Specifically, at step S51, the CPU 61 controls the servo control unit 63 to rotate the spindle motor 62 at a constant angular velocity (in accordance with the CAV mode). The velocity is the same as the velocity in the case where the spindle motor 27 of the disc recording device of FIG. 14 rotates the optical disc 1.

At step S52, the servo control unit 62 moves the optical pickup 64 in the radial direction of the optical disc 1 and causes the optical pickup 64 to reproduce the data in the burst cutting area 1A of the optical disc 1.

At step S53, demodulation processing is carried out. Specifically, the reproduced data outputted from the optical pickup 64 is inputted to the comparator 67 via the matrix amplifier 65 and the LPF 66 and is binarized there. The demodulating unit 68 samples the binary data inputted from the comparator 67 on the basis of the sampling clock supplied from the crystal oscillator 66 and demodulates the binary data. The demodulating unit 68 also carries out processing to correct the channel bits and word. The demodulated data of four blocks outputted from the demodulating unit 68 is supplied to the ECC unit 70.

At step S54, the ECC unit 70 performs error correction processing on the demodulated data of four blocks in total. Specifically, the ECC unit 70 executes ECC decoding processing by using the fixed data of 200 bytes described with reference to FIG. 6 for each block, and by using pointer erasure processing on the assumption that the parities of the latter 16 bytes of the parities of 32 bytes have been erased.

At step S55, the CPU 61 reads the header of the block on which error correction processing has been performed by the ECC unit 70. As described above with reference to FIG. 8, application ID of 6 bits is stored as BCA content data in the header. The CPU 61 extracts the application ID from the header, and at step S56, determines whether or not this application ID is available to the CPU 61 itself. If it is determined that the application ID thus read is not available to the CPU 61 itself, the CPU 61 cannot record data to or reproduce data from the optical disc 1. Therefore, the CPU 61 goes to step S62 and executes error processing. For example, the CPU 61 causes a display unit, not shown, to display a message like "this disc cannot be used."

If it is determined at step S56 that the application ID is available, the CPU 61 goes to step S57 and selects a block having the available application ID from the four blocks.

At step S58, the CPU 61 determines whether or not the disc ID has been multiple-written from the application ID and the block number. If the disc ID has been multiple-written, the CPU 61 goes to step S59 and selects one of the blocks in which multiple writing has been carried out. For example, if error correction cannot be carried out in the block selected by the processing of step S57, the CPU 61 selects another block in which multiple writing has been carried out (another block which has a header with the same (corresponding) application ID and block number recorded therein and can be error-corrected). If it is determined at step S58 that disc ID has not been multiple-written, the processing of step S59 is skipped. That is, in this case, the block selected at step S57 is the only block to be selected as the reading object.

Next, at step S60, the CPU 61 extracts the disc ID of the block selected by the processing of step S57 or step S59. Specifically, the disc ID is made up of the content data of FIG. 8. Having extracted the disc ID, the CPU 61 at step S62 controls the ECC unit 70 to store the disc ID in the register 71.

In this manner, if the loaded optical disc can be used, the disc ID information recorded in the burst cutting area 1A of the optical disc 1 is error-corrected and stored in the register 71.

Referring again to FIG. 17, at step S32, the CPU 61 controls the servo control unit 63 to rotate the optical disc 1 via the spindle motor 62 in accordance with the CLV mode. At step S33, the encryption processing unit 75 reads the disc ID information stored in the register 71.

At step S34, the encryption processing unit 75 encrypts content data for recording inputted from a device, not shown, on the basis of the disc ID information read from the register 71, and outputs the encrypted content data to the ECC unit 76. At step S35, the ECC unit 76 codes the content data inputted from the encryption processing unit 75 by using RS(248,216, 33) and outputs the coded content data to the modulating unit 77. At step S36, the modulating unit 77 modulates the coded content data inputted from the ECC unit 76 in accordance with a predetermined modulation mode and outputs the modulated content data to the optical pickup 64. At step S37, the optical pickup 64 records the content data inputted from the modulating unit 77 into the data area 1B of the optical disc 1.

Figure 19:
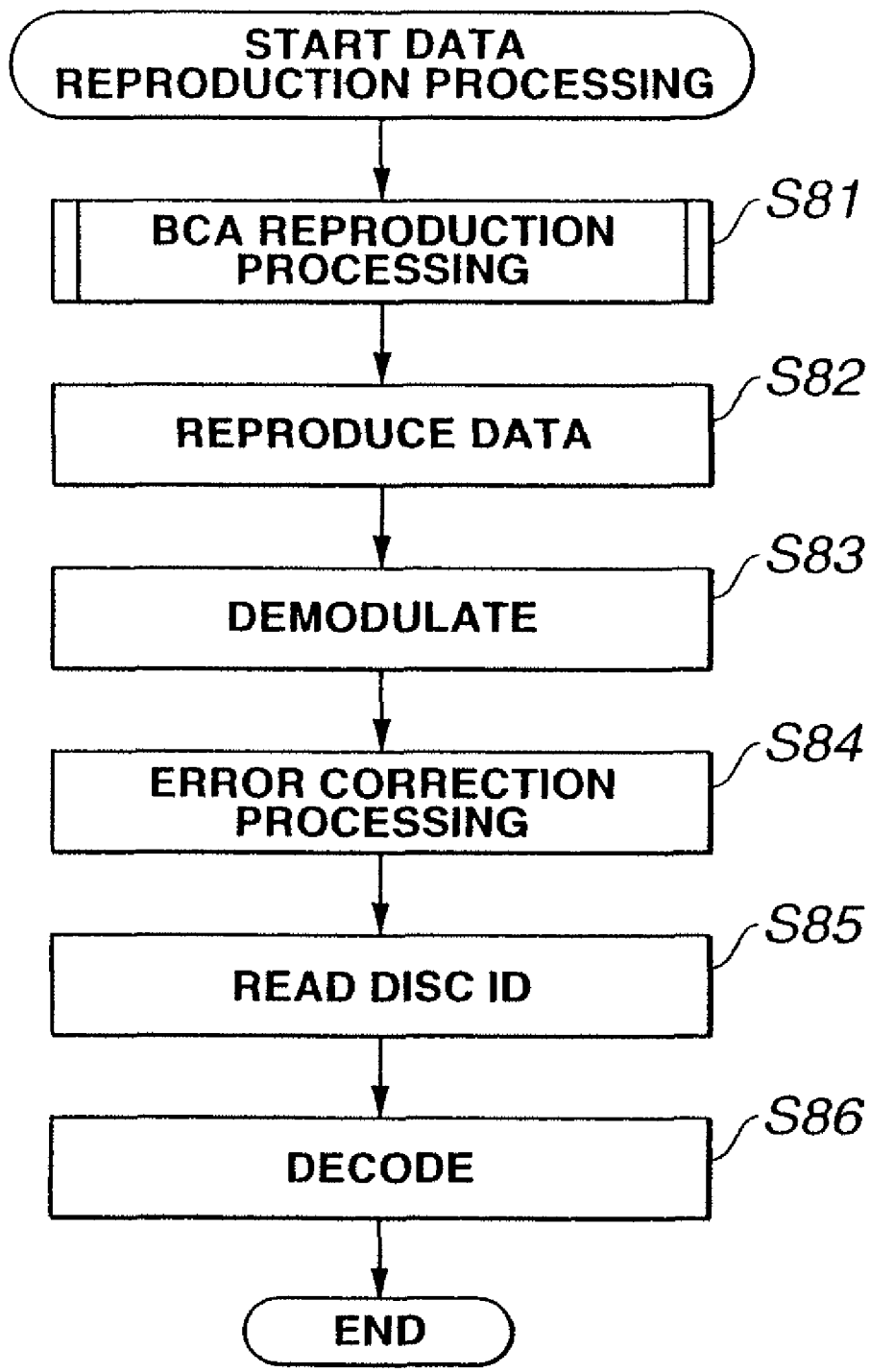
FIG. 19 is a flowchart for explaining data reproduction processing at the disc recording/reproducing device of FIG. 16.

The processing for reproducing content data will now be described with reference to the flowchart of FIG. 19.

First, at step S81, the BCA reproduction processing is executed. This processing similar to the processing shown in FIG. 18.

If the disc ID of the corresponding application ID is already stored in the register 71, this BCA reproduction processing can be omitted. However, if the application ID differs, the BCA reproduction processing is executed again.

The processing goes to step S82 and the CPU 61 executes the processing to reproduce data from the data area 1B.

Specifically, the CPU 61 controls the servo control unit 63 to rotate the optical disc 1 in accordance with the CLV mode similarly to the above-described case. The optical pickup 64 reproduces data in the data area 1B of the optical disc 1 and outputs the reproduced data to the matrix amplifier 65. The matrix amplifier 65 supplies the reproduced data to the demodulating unit 72.

At step S83, the demodulating unit 72 demodulates the reproduced content data inputted thereto in accordance with a demodulation mode corresponding to the modulation mode at the modulating unit 77, and outputs the demodulated data to the ECC unit 73. At step S84, the ECC unit 73 performs error correction processing on the demodulated data inputted from the demodulating unit 72 by using RS(248,216,33) as described above and then supplies the error-corrected data to the decryption processing unit 74. The decryption processing unit 74, at step S85, reads the disc ID stored in the register 71, and at step S86, decodes the content data (encrypted content data) inputted from the ECC unit 73 on the basis of the disc ID information read from the register 71 and outputs the decoded data to a device, not shown.

The content data is encrypted and then recorded in the data area 1B of the optical disc 1 as described above. Even when the encrypted content data is directly copied to another disc by a computer or the like, the disc ID information cannot be copied and the content data cannot be decrypted. Therefore, unauthorized copying of a large quantity of data can be substantially restrained.

In reproducing the disc ID information, it is assumed that the reproducing operation is carried out without performing tracking servo. Therefore, if the reproducing operation is carried out repeatedly over a plurality rotations of the optical disc 1, the radial position might be slightly shifted, generating different results of reproduction (reproduced data). Thus, the reproducing operation or correcting operation can be carried out over a plurality of rotations.

While disc ID is recorded as content data in the above description, auxiliary data other than disc ID may be recorded.

The present invention may also be applied to CD (compact disc), MD (mini disc: trade name by Sony Corporation) and DVD (digital versatile disc) as well as the above-described optical disc.

The above-described series of processing can also be executed by software. The software may be installed from a recording medium, for example, to a general-purpose personal computer which is capable of executing various functions, by installing a program constituting that software into a computer embedded in dedicated hardware, or by installing various programs.

The recording medium is constituted by a package medium such as the magnetic disk 41, 91 (including a flexible disk), the optical disc 42, 92 (including CD-ROM (compact disc-read only memory), DVD (digital versatile disc)), the magneto-optical disc 43, 93 (including so-called MD (mini disc: trade name by Sony Corporation)) or the semiconductor memory 44, 94, on which the program is recorded and which is distributed fro providing the program to a user, separately from the computer, as shown in FIG. 14 or FIG. 16.

In this specification, the steps describing the program recorded on the recording medium include the processing which is not necessarily carried out in time series but is executed in parallel or individually, as well as the processing carried out in time series in accordance with the described order.

Moreover, in this specification, the system refers to a whole device constituted by a plurality of devices.

While the invention has been described in accordance with certain preferred embodiments thereof illustrated in the accompanying drawings and described in the above description in detail, it should be understood by those ordinarily skilled in the art that the invention is not limited to the embodiments, but various modifications, alternative constructions or equivalents can be implemented without departing from the scope and spirit of the present invention as set forth and defined by the appended claims.

INDUSTRIAL APPLICABILITY

According to the present invention, the same disc recording medium can be managed by a plurality of applications.

Each application can learn the structures of blocks and can determine whether data of each block has been multiple-written or not.

In each block, data which is longer than the data part of the block can be recorded.

The invention claimed is:

1. An information recording device for recording main data onto a disc recording medium having a data area for recording the main data and a burst cutting area for recording auxiliary information, the device comprising:

first acquisition means for acquiring the auxiliary information recorded in the burst cutting area, the auxiliary information being blocked to generate error correction blocks based on an error correction code with a header added thereto, the header containing an identification number and a block number;

control means for performing control so that when said auxiliary information is double-written in first and second error correction blocks, said first and second error correction blocks have identical block numbers written therein, and when the auxiliary information is written over a plurality of error correction blocks, the plurality of error correction blocks have block numbers that are serial numbers;

second acquisition means for acquiring the main data;

encryption means for encrypting the main data acquired by the second acquisition means on the basis of the identification number of the auxiliary information acquired by the first acquisition means;

modulation means for modulating the main data encrypted by the encryption means; and recording means for recording the main data modulated by the modulation means into the data area on the disc recording medium.

2. The information recording device as claimed in claim 1, wherein only a part of parities having a length of k−1 of the auxiliary information is encoded.

3. The information recording device as claimed in claim 2, wherein only parities of (k−1)/2, which are a part of parities having a length of k−1, of the auxiliary information are encoded.

4. The information recording device as claimed in claim 1, wherein the error correcting code RS(m,n,k) is RS(248, 216, 33).

5. An information recording method for an information recording device which records main data onto a disc recording medium having a data area for recording the main data and a burst cutting area for recording auxiliary information, the method comprising:

a first acquisition step of acquiring the auxiliary information recorded in the burst cutting area, the auxiliary information being blocked to generate error correction blocks with a header added thereto, the header containing an identification number and a block number;

a control step of performing control so that when said auxiliary information is double-written in first and second error correction blocks, said first and second error correction blocks have identical block numbers written therein, and when the auxiliary information is written over a plurality of error correction blocks, the plurality of error correction blocks have block numbers that are serial numbers;

a second acquisition step of acquiring the main data;

an encryption step of encrypting the main data acquired by the processing of the second acquisition step on the basis of the identification number of the auxiliary information acquired by the processing of the first acquisition step;

a modulation step of modulating the main data encrypted by the processing of the encryption step; and a recording step of recording the main data modulated by the processing of the modulation step into the data area on the disc recording medium.

6. A non-transitory computer-readable medium having computer-executable instruction recorded thereon, the computer-executable instruction being adapted for an information recording device which record main data onto a disc recording medium having a data are for recording the main data and a burst cutting area for recording auxiliary information, the computer executable instruction controlling a computer to perform operations comprising:

a first acquisition step of acquiring the auxiliary information recorded in the burst cutting area, the auxiliary information being blocked to generate error correction blocks with a header added thereto, the header containing an identification number and a block number;

a control step of performing control so that when said auxiliary information is double-written in first and second error correction blocks, said first and second error correction blocks have identical block numbers written therein, and when the auxiliary information is written over a plurality of error correction blocks, the plurality of error correction blocks have block numbers that are serial numbers;

a second acquisition step of acquiring the main data;

an encryption step of encrypting the main data acquired by the processing of the second acquisition step on the basis of the identification number of the auxiliary information acquired by the processing of the first acquisition step;

a modulation step of modulating the main data encrypted by the processing of the encryption step; and a recording step of recording the main data modulated by the processing of the modulation step into the data area on the disc recording medium.

7. An information recording device for recording main data onto a disc recording medium having a data area for recording the main data and a burst cutting area for recording auxiliary information, the device comprising:

a controller that acquires the auxiliary information recorded in the burst cutting area, the auxiliary information being blocked to generate error correction blocks based on an error correction code with a header added thereto, the header containing an identification number and a block number;

the controller further performing control so that when said auxiliary information is double-written in first and second error correction blocks, said first and second error correction blocks have identical block numbers written therein, and when the auxiliary information is written over a plurality of error correction blocks, the plurality of error correction blocks have block numbers that are serial numbers;

the controller further acquiring the main data;

an encryption processing unit that encrypts the main data acquired by the second acquisition means on the basis of the identification number of the auxiliary information acquired by the controller;

a modulation unit that modulates the main data encrypted by the encryption processing unit; and an optical pickup that records the main data modulated by the modulation unit into the data area on the disc recording medium.

8. The information recording device as claimed in claim 7, wherein only a part of parities having a length of k−1 of the auxiliary information is encoded.

9. The information recording device as claimed in claim 8, wherein only parities of (k−1)/2, which are a part of parities having a length of k−1, of the auxiliary information are encoded.

10. The information recording device as claimed in claim 7, wherein the error correcting code RS(m,n,k) is RS(248, 216, 33).

* * * * *